United States Patent
An

(10) Patent No.: US 10,313,662 B2
(45) Date of Patent: Jun. 4, 2019

(54) GLASSES-FREE AUTOSTEREOSCOPIC 3D DISPLAY DEVICE

(71) Applicant: LG Display Co., Ltd., Seoul (KR)

(72) Inventor: ChungHwan An, Seoul (KR)

(73) Assignee: LG Display Co., Ltd., Seoul (KR)

( * ) Notice: Subject to any disclaimer, the term of this patent is extended or adjusted under 35 U.S.C. 154(b) by 546 days.

(21) Appl. No.: 14/971,988

(22) Filed: Dec. 16, 2015

(65) Prior Publication Data

US 2016/0191904 A1 Jun. 30, 2016

(30) Foreign Application Priority Data

Dec. 26, 2014 (KR) .......................... 10-2014-0191080

(51) Int. Cl.
| | |
|---|---|
| *H04N 13/302* | (2018.01) |
| *H04N 13/305* | (2018.01) |
| *H04N 13/31* | (2018.01) |
| *H04N 13/317* | (2018.01) |
| *H04N 13/324* | (2018.01) |
| *H04N 13/383* | (2018.01) |
| *G02B 27/22* | (2018.01) |
| *H04N 13/349* | (2018.01) |

(52) U.S. Cl.
CPC ....... *H04N 13/302* (2018.05); *G02B 27/2214* (2013.01); *H04N 13/305* (2018.05); *H04N 13/31* (2018.05); *H04N 13/317* (2018.05); *H04N 13/324* (2018.05); *H04N 13/349* (2018.05); *H04N 13/383* (2018.05)

(58) Field of Classification Search
CPC ........... H04N 13/0422; H04N 13/0404; H04N 13/0415; H04N 13/0409; H04N 13/0445; H04N 13/0402; H04N 13/0484; G02B 27/2214

USPC .......................................................... 348/54
See application file for complete search history.

(56) References Cited

U.S. PATENT DOCUMENTS

| | | | | |
|---|---|---|---|---|
| 5,991,073 A | * | 11/1999 | Woodgate | H04N 13/0404 348/E13.004 |
| 8,345,088 B2 | * | 1/2013 | Harrold | G02B 27/2214 348/51 |
| 9,674,509 B2 | * | 6/2017 | Kim | H04N 13/31 |

(Continued)

FOREIGN PATENT DOCUMENTS

| | | |
|---|---|---|
| CN | 103916655 A | 7/2014 |
| EP | 2753086 A2 | 7/2014 |

(Continued)

OTHER PUBLICATIONS

European Extended Search Report, European Application No. 15195792.5, dated May 27, 2016, 8 pages.

(Continued)

*Primary Examiner* — Susan E. Hodges
(74) *Attorney, Agent, or Firm* — Fenwick & West LLP

(57) ABSTRACT

An autostereoscopic 3D display device may be configured to set the width of a viewing zone to a proper fraction of the interocular distance while at the same time overlapping the viewing zones with each other. Through this, an autostereoscopic 3D display device allowing the input and output of stereo image data may be implemented to reduce the number of image sources as well as reduce 3D crosstalk. In addition, the autostereoscopic 3D display device may apply view data rendering to extend a 3D viewing zone.

17 Claims, 27 Drawing Sheets

(56) References Cited

U.S. PATENT DOCUMENTS

| | | | |
|---|---|---|---|
| 2003/0016444 A1 | 1/2003 | Brown et al. | |
| 2010/0315324 A1* | 12/2010 | Nam | G02F 1/133615 |
| | | | 345/102 |
| 2013/0100258 A1* | 4/2013 | Kim | H04N 13/0434 |
| | | | 348/51 |
| 2013/0329021 A1* | 12/2013 | Fidler | G02B 26/04 |
| | | | 348/54 |
| 2014/0071253 A1* | 3/2014 | de la Barre | H04N 13/0404 |
| | | | 348/51 |
| 2015/0015681 A1* | 1/2015 | Kim | G02B 27/2214 |
| | | | 348/51 |
| 2015/0015686 A1* | 1/2015 | de la Barre | H04N 13/0404 |
| | | | 348/59 |

FOREIGN PATENT DOCUMENTS

| | | |
|---|---|---|
| EP | 2811746 A1 | 12/2014 |
| WO | WO 2013/115444 A1 | 8/2013 |

OTHER PUBLICATIONS

Chinese First Office Action, Chinese Application No. 201510674344.5, dated Jun. 2, 2017, 16 pages.

* cited by examiner

FIG. 11

| | 1st VIEW | 2nd VIEW | 3rd VIEW | 4th VIEW |
|---|---|---|---|---|
| VIEW DATA | 1 | 1 | 2 | 2 |
| LE PERCEIVED IMAGE | 1 | 1 | 2 | 2 |
| RE PERCEIVED IMAGE | 2 | 2 | 1 | 1 |
| 3D VIEWING ZONE | | | | |

▨ 3D VIEWING ZONE

▨ INVERSED STEREOSCOPIC IMAGE ZONE

| | 1st VIEW | 2nd VIEW | 3rd VIEW | 4th VIEW | 5th VIEW | 6th VIEW | 7th VIEW | 8th VIEW | 9th VIEW | 10th VIEW | 11th VIEW | 12th VIEW | 13th VIEW |
|---|---|---|---|---|---|---|---|---|---|---|---|---|---|
| VIEW DATA | 1 | 1 | 1 | 1 | 1 | 1 | 2 | 2 | 2 | 2 | 2 | 2 | 2 |
| LE PERCEIVED IMAGE | 1 | 1 | 1 | 1 | 1 | 1 | 2 | 2 | 2 | 2 | 2 | 2 | 2 |
| RE PERCEIVED IMAGE | 2 | 2 | 2 | 2 | 2 | 2 | 2 | 1 | 1 | 1 | 1 | 1 | 1 |
| 3D VIEWING ZONE | | | | | | | | | | | | | |

▨ 3D VIEWING ZONE  ▦ INVERSED STEREOSCOPIC IMAGE ZONE  ▥ 2D VIEWING ZONE

GLASSES-FREE AUTOSTEREOSCOPIC 3D DISPLAY DEVICE

CROSS-REFERENCE TO RELATED APPLICATIONS

This application claims the benefit of Korean Patent Application No. 10-2014-0191080, filed on Dec. 26, 2014, which is hereby incorporated by reference for all purposes as if fully set forth herein.

BACKGROUND

1. Field of the Invention

The present invention relates to a stereoscopic 3D display device, and more particularly, to a glasses-free autostereoscopic 3D display device.

2. Description of the Related Art

Three-dimensional (3D) display may be briefly defined as "all types of systems for artificially generating a 3D screen."

A system may include software technologies that produce three-dimensional images and hardware for actually displaying 3D content made by the software technologies. The systems typically include a software component because 3D content produced with a particular software scheme are separately required for each 3D stereoscopic display hardware implementation.

Furthermore, virtual 3D display (hereinafter, referred to as a stereoscopic 3D display device) may be defined as all types of systems for allowing a user to experience depth in planar display hardware by using binocular disparity due to human eyes being separated from each other by about 65 mm in the horizontal direction among various factors for allowing a person to perceive a three-dimensional effect. In other words, human eyes view slightly different images (strictly speaking, left and right spatial information being slightly divided) even when viewing the same object due to binocular disparity, and if those two images are transmitted to the brain through the retina, then the brain fuses two images together in a correct manner to allow us to perceive depth. Using this phenomenon, a stereoscopic 3D display device implements virtual depth through a design of displaying left and right images at the same time on a two-dimensional display device such that they are perceived by a left eye and a right eye, respectively.

In order to display two channel images on a screen in the stereoscopic 3D display device, for example, each channel is outputted by changing each row in one direction (horizontal or vertical) on a screen. In this manner, in the case of a glasses-free type from the viewpoint of hardware structure, when two channel images are outputted at the same time on a display device, the right image is incident on the right eye and the left image is incident on the left eye. Furthermore, in the case of a glasses wearing types, a method is used to hide the right image from the left eye and hide the left image from the right eye using specific glasses suitable to each type.

One factor for allowing a person to perceive stereoscopic and depth effects is binocular disparity due to a distance between two eyes, but also closely related are psychological and memory factors, and therefore, 3D implementation methods are typically divided into a volumetric type, a holographic type, and a stereoscopic type based on the level of three-dimensional image information provided to an observer.

One example of the volumetric type is a method of providing a perspective in a depth direction due to a psychological factor and a suction effect that may be applicable to 3D computer graphics in which perspective projection, overlapping, shadow, luminance, movement, and the like are displayed based on calculations. Another example is the so-called IMAX cinemas in which a large-sized screen having a wide viewing angle is provided to an observer to evoke an optical illusion and create the feeling of being sucked into a space.

The holographic type is known as the most complete 3D implementation technique. Examples include laser beam reproduction holography and white light reproduction holography.

The stereoscopic type is a method of feeling a stereoscopic effect using a binocular physiological factor that uses the human brain's capacity of generating spatial information prior to and subsequent to a display plane where associative images of a plane including parallax information are seen on human left and right eyes being separated from each other by about 65 mm and the brain combines them to perceive a stereoscopic effect, as described above, namely, stereography. The stereoscopic type may be largely divided into a glasses-wearing type and a glasses-free type.

A representative method of the glasses-free type may include a lenticular lens mode and a parallex barrier mode in which a lenticular lens sheet on which cylindrical lenses are vertically arranged is provided at a front side of the image panel.

FIG. 1 is a view for explaining the concept of a typical lenticular lens type stereoscopic 3D display device in which a relationship between rear surface distance (S) and viewing distance (d) is shown.

Furthermore, FIG. 2 is a view illustrating a lenticular lens type stereoscopic 3D display device and a light profile, as an example.

Here, viewing diamonds, light profiles, and view data forming a viewing zone are illustrated in FIG. 2.

Referring to FIGS. 1 and 2, a typical lenticular lens type stereoscopic 3D display device may include an upper and a lower substrate, a liquid crystal panel 10 filled with liquid crystals therebetween, a backlight unit (not shown) located on a rear surface of the liquid crystal panel 10 to irradiate light, and a lenticular lens sheet 20 located on a front surface of the liquid crystal panel 10 to implement a stereoscopic image.

The lenticular lens sheet 20 is formed with a plurality of lenticular lenses 25, an upper surface of which is made of a convex lens shaped material layer on a flat substrate.

The lenticular lens sheet 20 performs the role of dividing left-eye and right-eye images, and diamond shaped viewing diamonds (normal view zone) 30 in which images corresponding to the left-eye and right-eye are formed at an optimal 3D distance (d) from the lenticular lens sheet 20 and are normally incident on the left-eye and right-eye, respectively.

The width of one viewing diamond 30 is the viewer's interocular distance (e) to provide parallax images incident on the viewer's left-eye and right-eye, respectively, as a stereoscopic image.

Here, each viewing diamond 30 is formed with the corresponding sub-pixel view data, namely, image, of the liquid crystal panel 10.

View data denotes an image captured by cameras separated by a reference measure of the interocular distance (e).

In such a typical lenticular lens type stereoscopic 3D display device, the liquid crystal panel 10 and lenticular lens sheet 20 are supported by a mechanical body (not shown), and the liquid crystal panel 10 and lenticular lens sheet 20 are separated by a predetermined distance (rear surface distance; S).

Here, a gap glass 26 is inserted into the typical lenticular lens type stereoscopic 3D display device to constantly maintain the rear surface distance (S).

Since a lenticular lens type stereoscopic 3D display device is implemented in a multi-view mode formed based on an initially designed view map, the viewer may view a 3D image when entering a predetermined view zone.

Here, referring to a light profile measured at an optimal viewing distance (d) with reference to FIG. 2, it is seen that the intensity of light is the highest at the center of the viewing diamond 30 and gradually reduces toward the end of the viewing diamond 30. A difference between the maximum and minimum of the intensity of light may be defined as a luminance difference (LD) (ΔL), and typical lenticular lens type stereoscopic 3D display devices show a large luminance difference, thereby having an effect on their image quality.

An image difference between views perceived due to the user's movement between the viewing diamonds 30 is called image flipping, and the difference is greatest when moving from a normal view to a reversed view or vice versa. Accordingly, an image difference between first view data and last view data increases as the number of views increases, thereby deteriorating the phenomenon of image flipping.

In order to implement a multi-view in the related art, a multi-view image captured by a plurality of cameras may be used as an image source or a 2D or stereo image may be received and converted into a multi-view image for use.

In the case of directly receiving a multi-view image, application is difficult in reality since a lot of cost is incurred for the image production, and the number and structure of views required are different for different stereoscopic 3D display devices and configurations.

Furthermore, in order to convert a 2D or stereo image into a multi-view image for use, a depth map and a multi-view may be generated to carry out view mapping based on them. In this case, it may cause image quality deterioration due to the absence of the amount of information and depth reduction due to inner view generation. Furthermore, a multi-view converter is essentially required, and the size of chip and system increases and the time and cost increases as the number of operations applied to compensate for image quality deterioration increases.

SUMMARY

The present disclosure is to solve the foregoing problems, and an object of the present disclosure is to provide an autostereoscopic 3D display device for removing or minimizing 3D crosstalk, luminance difference, and image flipping in stereoscopic images, thereby enhancing the depth of stereoscopic images.

Another object of the present disclosure is to provide an autostereoscopic 3D display device allowing the input and output of stereo type image data.

Other objects and features of the present invention will be described in the configuration of the invention and claims which follow hereinbelow.

In order to accomplish the foregoing object, an autostereoscopic 3D display device according to an embodiment of the present disclosure may include an image panel comprising a plurality of sub-pixels. The image panel may be driven by stereo type image data (or view data) such that the plurality of sub-pixels collectively output light corresponding to the stereo view data to implement a 3D image.

The image panel may be sequentially allocated with a first view through an m-th view on m sub-pixels (where m is a natural number). When driven by stereo type view data, each of the first view through the m-th view is either an instance of the first view image or an instance of the second view image.

An autostereoscopic 3D display device according to an embodiment of the present disclosure may include a 3D filter disposed on a front surface of the image panel to divide an optical axis of the outputted view data to form viewing diamonds displayed with a first view image and a second view image at a viewing distance. The 3D filer may selectively direct portions of the outputted light to a plurality of viewing zones (e.g., diamond shaped viewing zones) at a given viewing distance such that portions of the outputted light form instances of the first view image in a first subset of the plurality of viewing zones and instances of the second view image in a second subset of the plurality of viewing zones. In one embodiment, the 3D filter includes a lenticular lens slanted with respect to the sub-pixel at a predetermined angle.

In an autostereoscopic 3D display device according to an embodiment of the present disclosure, the viewing diamonds may be overlapped with each other while a width of the viewing diamond is a proper fraction (a/n) of the interocular distance between an observer's eyes (where a and n are natural numbers satisfying the condition: a<n). In one embodiment, the distance between centers of adjacent viewing zones is less than the interocular distance.

On the basis of the nearest adjacent three views, the first view through the m-th view may be allocated to the image panel so as to set red, green, and blue colors to 1:1:1. In other words, a first sub-pixel, a second sub-pixel, and a third sub-pixel nearest to each other in the image panel and outputting a same view includes one red sub-pixel, one green sub-pixel, and one blue sub-pixel.

The view data of stereo type outputted though the image panel may have a selectively 2D cognition domain. In other words, the first subset of the viewing zones includes at least one location at an instance of the first view image is formed at both of the observer's eyes.

In one embodiment, each of the first subset of viewing zones overlaps at least one other viewing zone from the first subset of viewing zones, and each of the second subset of viewing zones overlaps at least one other viewing zone from the second subset of viewing zones. Furthermore, at least one of the viewing zones from the first subset of viewing zones overlaps at least one of the viewing zones from the second subset of viewing zones.

Input data may be overlapped by (m−1)/2 when using m views (where m is a natural number).

For example, the first view image may be inputted in the first view through the (m−1)/2 view of the image panel, and the second view image may be inputted in the (m+1)/2 view through the m view of the image panel. Thus, the first subset of viewing zones includes views one through (m−1)/2 and the second subset of viewing zones includes views (m+1)/2 through m. In one embodiment, the first subset of viewing zones contains one more viewing zone than the second subset of viewing zones. In another embodiment, the second subset of viewing zones contains one more viewing zone than the first subset of viewing zones. In yet another embodiment, the first and second subsets of viewing zones contain an identical number of viewing zone.

The autostereoscopic 3D display device may further include a host system supplying the view data of stereo type to a timing controller, wherein the view data of stereo type include view data for a left-eye and view data for a right-eye.

The thickness of an intervening layer (e.g., a gap glass) interposed between the image panel and the 3D filter may be adjusted so as to set the width of the viewing diamond to a/n times of the interocular distance (where a and n are natural numbers satisfying the condition: a<n). In one embodiment, where the width of each viewing zone is a proper fraction of the interocular distance, the thickness of the intervening layer is the product of the reciprocal of the proper fraction and a base thickness of the intervening layer.

In various embodiments, the interocular distance of the observer is estimated based on the typical interoptical distance between human eyes.

As described above, an autostereoscopic 3D display device according to the present disclosure may implement an autostereoscopic 3D display device allowing the input and output of stereo type image data, thereby reducing the number of image sources as well as reducing 3D crosstalk. Accordingly, the present disclosure may provide an effect of reducing the cost as well as enhancing the image quality.

In addition, the present disclosure may apply view data rendering to remove image quality deterioration due to a multi-view converter to overlap with part of a 2D zone, thereby extending a 3D viewing zone.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 11 is a view illustrating input data input to a pixel array illustrated in FIG. 10, as an example;

FIG. 31 is a view illustrating input data input to a pixel array illustrated in FIG. 29, as an example;

FIG. 32 is a view illustrating images and 3D viewing zones perceived from the left-eye and right-eye in an autostereoscopic 3D display device according to the fifth embodiment of the present disclosure illustrated in FIG. 29, as an example;

DETAILED DESCRIPTION

Figure 1:
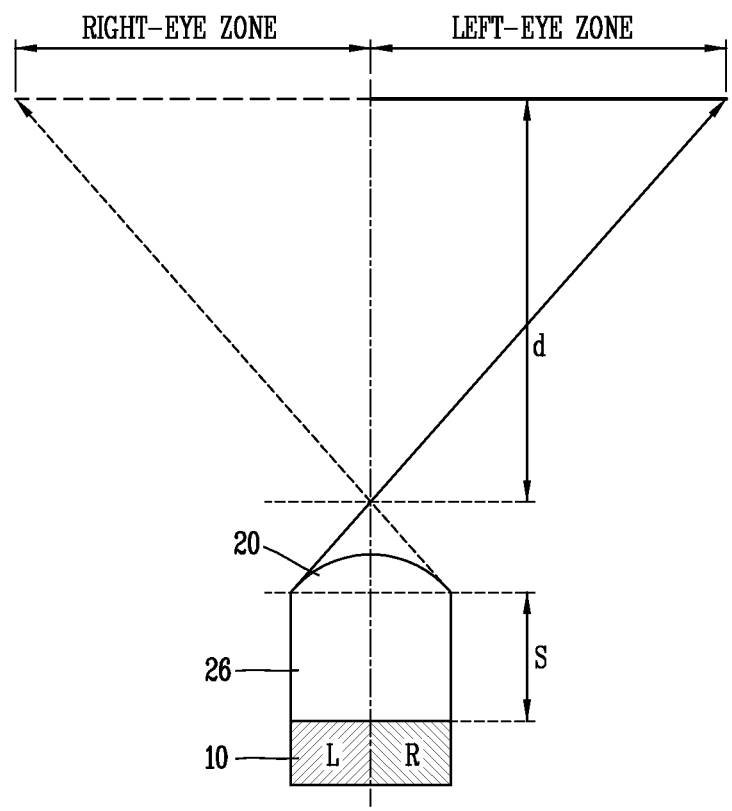
FIG. 1 is a view for explaining the concept of a typical lenticular lens type stereoscopic 3D display device.
Figure 2:
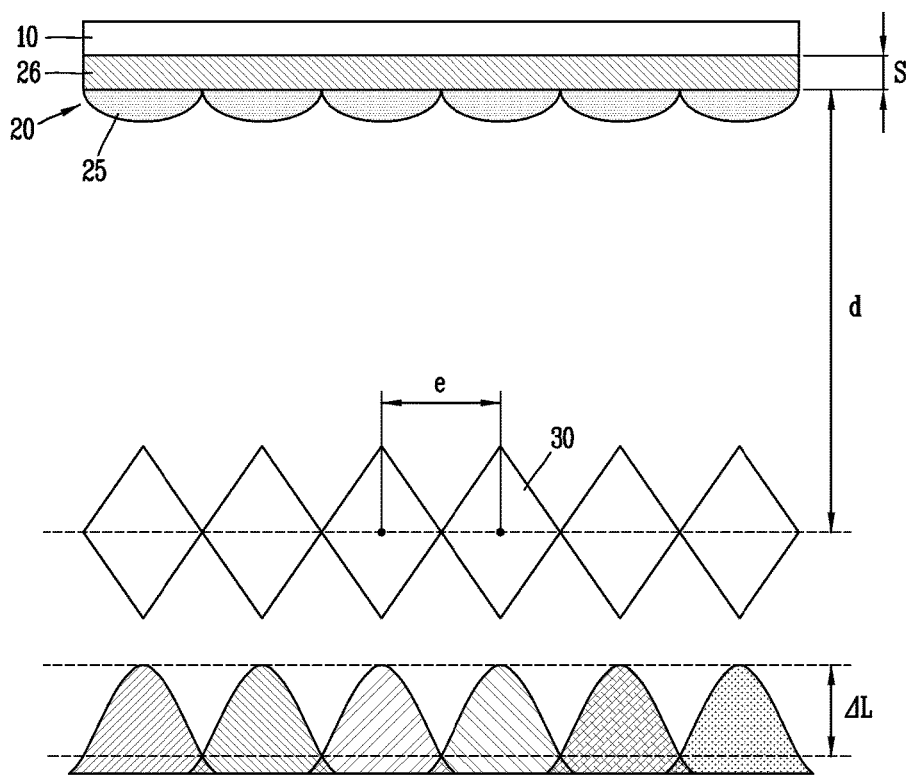
FIG. 2 is a view illustrating a typical lenticular lens type stereoscopic 3D display device and a light profile, as an example.

Hereinafter, preferred embodiments of the present invention will be described in detail with reference to the accompanying drawings to such an extent that the present invention can be easily embodied by a person having ordinary skill in the art to which the present invention pertains.

Advantages and features of the present disclosure, and methods of accomplishing the same will be clearly understood with reference to the following embodiments described in detail in conjunction with the accompanying drawings. However, the present disclosure is not limited to those embodiments disclosed below but may be implemented in various different forms. It should be noted that the present embodiments are merely provided to make a full disclosure of the invention and also to allow those skilled in the art to know the full range of the invention, and therefore, the present invention is to be defined only by the scope of the appended claims. Further, like reference numerals refer to like or similar elements throughout the specification. In the drawings, the size and relative size of layers and regions may be exaggerated for the clarity of the description.

Furthermore, an element or layer referred to as being "on" another element or layer may include both a case where it is directly on the another element or layer and a case where another element and layer is interposed therebetween. In contrast, an element referred to as being "directly on" another element indicates a case where another element and layer is not interposed therebetween.

Spatially relative terms such as "below," "beneath," "lower," "above," or "upper" may be used herein to describe a correlation between one device or constituent element and other devices or constituent elements as illustrated in the drawings. It will be understood that spatially relative terms are intended to include a different direction of device during the use or operation in addition to its direction illustrated in the drawings. For example, when a device in the drawing is turned over, the device described as "below" or "beneath" another device will be placed "above" the another device. Accordingly, the exemplary terms "below" or "beneath" may include both directions of above and below. Since the device may be oriented in another direction, and thus the spatially relative terms may be interpreted in accordance with the orientation thereof.

It should be noted that the terms used herein are merely used to describe the embodiments, but not to limit the present invention. In the present specification, unless clearly used otherwise, expressions in a singular form include a plural form. The term "comprises" and/or "comprising" used in the specification intend to express a constituent element, a step, an operation, and/or a device does not exclude the existence or addition of one or more other constituent elements, steps, operations, and/or devices.

Figure 3:
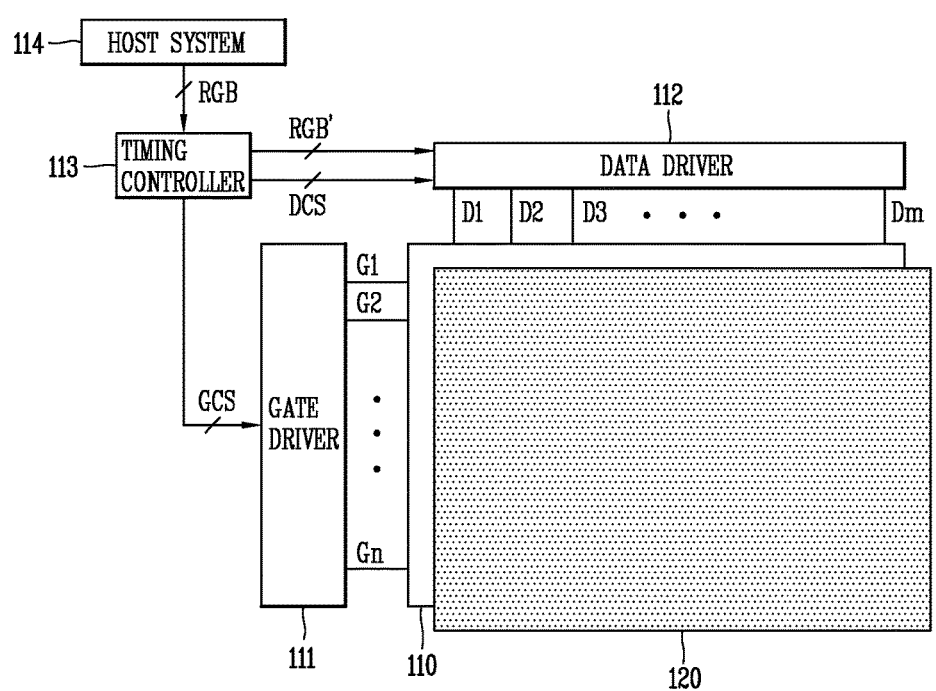
FIG. 3 is a block diagram schematically illustrating the configuration of an autostereoscopic 3D display device according to one embodiment of the present disclosure.

FIG. 3 is a block diagram schematically illustrating the configuration of an autostereoscopic 3D display device according to one embodiment of the present disclosure.

Referring to FIG. 3, an autostereoscopic 3D display device according to the present disclosure may largely include an image panel 110, an image panel driver 111, 112, a 3D filter 120, a filter driver (not shown), and a timing controller 113.

The stereoscopic 3D display device may be implemented by a flat display device such as any one of a liquid crystal display (LCD), an organic light emitting display device (OLED), a field emission display (FED), a plasma display panel (PFP), an electroluminescent display (EL), and the like. The present disclosure illustrates a case where the image panel 110 is configured with a liquid crystal display device in the following embodiment, but is not limited to this.

Here, a plurality of sub-pixels displaying red, green, and blue are formed on the image panel 110, and the sub-pixels are divided into left-eye pixels and right-eye pixels displaying a left-eye image and a right-eye image, respectively, to display a stereoscopic image, along with the operation of the 3D filter 120.

For example, when the image panel 110 is configured with a liquid crystal display device, the present disclosure may be applicable regardless of its liquid crystal mode including a twisted nematic (TN) mode, an in-plane switching (IPS) mode, a fringe field switching (FFS) mode, or a vertical alignment (VA) mode.

Here, though not shown in the drawing, the image panel 110 may be largely configured with a color filter substrate, an array substrate, and a liquid crystal layer formed between the color filter substrate and the array substrate.

The color filter substrate may include a color filter configured with a plurality of sub-color filters implementing red, green, and blue, a black matrix (BM) configured to divide between the sub-color filters for blocking light passing through the liquid crystal layer, and a transparent common electrode for applying a voltage to the liquid crystal layer.

The array substrate may include a plurality of gate lines (G1, G2, G3, . . . , Gn) and data lines (D1, D2, D3, . . . , Dm) defining a plurality of pixel regions, a thin film transistor which is a switching element formed at an intersection region of a gate line (G1, G2, G3, . . . , Gn) and a corresponding data line (D1, D2, D3, . . . , Dm), and a pixel electrode formed on the pixel region.

The thin film transistor may include a gate electrode connected to the gate line (G1, G2, G3, . . . , Gn), a source electrode connected to the data line (D1, D2, D3, . . . , Dm), and a drain electrode electrically connected to the pixel electrode. Furthermore, the thin film transistor may include a gate insulating layer for insulating between the gate electrode and the source/drain electrode and an active layer for forming a conductive channel between the source electrode and the drain electrode by a gate voltage supplied to the gate electrode.

An upper polarizer is adhered to an outer surface of the color filter substrate, and a lower polarize is adhered to an outer surface of the array substrate. A light transmitting axis of the upper polarizer and a light transmitting axis of the lower polarized may be formed to be perpendicular to each other. Furthermore, an alignment layer for configuring a pre-tilt angle of the liquid crystal layer is formed on an inner surface of the color filter substrate and array substrate, and a spacer for maintaining a cell gap of the liquid crystal cell is formed between the color filter substrate and array substrate.

The image panel 110 having the foregoing configuration displays an image under the control of the timing controller 113.

The image panel 110 may display a 2D image in a 2D mode and a 3D image in a 3D mode under the control of the timing controller 113.

Here, in the case of the present disclosure, 2D or stereo type image (hereinafter, referred to as a 2-view image) data instead of the multi-view image data of the related art may be used to implement a 3D image.

Basically, a view of a stereoscopic image may be generated by allowing cameras to be separated by a viewer's interocular distance and capturing images of an object. For example, when an object is captured using nine cameras, the image panel 110 may display nine views of a stereoscopic image. For another example, 2D or stereo images received by a multi-view converter may be converted into a multi-view image for use.

However, when a multi-view image is directly received as described above, a lot of cost is required to produce the image, and its application is not easy since the number of views and their structure are different for different types and configurations of stereoscopic 3D display device. Furthermore, when the received 2D or stereo images is converted into a multi-view image for use, the cost increases due to image quality deterioration according to the absence of image information and the use of a multi-view converter.

As a result, the present disclosure may implement 3D using 2-view image data instead of multi-view image data to overcome the foregoing problems. To this end, a stereoscopic 3D display device according to the present disclosure may use a narrow viewing diamond (NVD) technology.

The NVD technology has been proposed through Korean application 10-2014-0120366 filed by the present applicant.

In general, when a 2-view image having a disparity between the viewer's left-eye and right-eye is received, it is perceived as a 3D image, but the number of views may be increased to secure a viewing zone. Accordingly, the present disclosure may implement 3D using only 2-view image data received in a state that a viewing zone is secured using NVD technology. Here, a 2D perception zone may be selectively formed when forming image data displayed through the image panel 110 to extend the viewing zone. In other words, images having a disparity are perceived by the left-eye and right-eye in a mixed manner, and thus cannot be perceived as 2D since there exists crosstalk between views.

The image panel driver 111, 112 may include a gate driver 111 for supplying data voltages for 2D/3D images to the data lines (D1, D2, D3, . . . , Dm) of the image panel 110 and a data driver 112 for sequentially supplying a scan pulse (or gate pulse) to the gate lines (G1, G2, G3, . . . , Gn) of the image panel 110. The image panel driver 111, 112 spatially distributes and writes the left-eye and right-eye input data in a 3D mode on the sub-pixels of the image panel 110.

The timing controller 113 receives timing signals such as a data enable (DE) signal, a dot clock (CLK), and the like to generate control signals (GCS, DCS) for controlling the operation timing of the gate driver 111 and data driver 112.

In other words, the timing controller 113 may drive the image panel 110 with a predetermined frame frequency based on image data and timing signals received from a host system 114, and generate a gate control signal (GCS) and a data control signal (DCS) based on the predetermined frame frequency. The timing controller 113 supplies the gate control signal (GCS) to the gate driver 111, and supplies image data (RGB') and the data control signal (DCS) to the data driver 112.

The gate control signal (GCS) for controlling the gate driver 111 may include a gate start pulse, a gate shift clock, a gate output enable signal, and the like. The gate start pulse controls the timing of a first gate pulse. The gate shift clock is a clock signal for shifting the gate start pulse. The gate output enable signal controls the output timing of the gate driver 111.

The data control signal (DCS) for controlling the data driver 112 may include a source start pulse, a source sampling clock, a source output enable signal, a polarity control signal, and the like. The source start pulse controls a data sampling start time point of the data driver 112. The source sample clock is a clock signal for controlling the sampling operation of the data driver 112 based on a rising or falling edge. If digital video data to be input to the data driver 112 is transmitted with the mini low voltage differential signalling (LVDS) interface standard, the source start pulse and source sample clock may be omitted. The polarity control signal reverses the polarity of a data voltage output from the data driver 112 for L horizontal periods (where L is a natural number). The source output enable signal controls the output timing of the data driver 112.

The data driver 112 may include a plurality of source drive ICs. The source drive ICs convert image data (RGB') received from the timing controller 113 into a positive/negative gamma compensation voltage to generate positive/negative analog data voltages. The positive/negative analog data voltages output from the source drive ICs are supplied to data lines (D1, D2, D3, . . . , Dm) of the image panel 110.

The gate driver 111 may include one or more gate drive ICs. The gate driver 111 may include a shift register, a level shifter for converting an output signal of the shift register to a swing width suitable to the operation of a TFT of the liquid crystal cell, an output buffer, and the like. The gate driver 111 sequentially supplies a gate pulse synchronized with a data voltage to the gate lines (G1, G2, G3, . . . , Gn) of the image panel 110 under the control of the timing controller 113.

The host system 114 supplies image data, timing signals, and the like to the timing controller 113 through an interface such as a low voltage differential signalling (LVDS) interface, a transition minimized differential signalling (TMDS) interface, or the like. The host system 114 according to embodiments of the present disclosure supplies 2-view image data including left-eye image data and right-eye image data to the timing controller 113. As described above, the timing signals may include a vertical synchronization signal, a horizontal synchronization signal, a data enable signal, a dot clock, and the like.

Next, as a medium for optically dividing the path of an image, the 3D filter 120 performs the role of forming a light transmitting region and a light blocking region for transmitting or blocking a left-eye image and a right-eye image output from the left-eye pixel and the right-eye pixel of the image panel 110, respectively.

The 3D filter 120 may be formed in various ways using well-known technologies such as a lenticular lens or barrier The lenticular lens and barrier may be implemented with a switchable lens or switchable barrier that is electrically controlled using a liquid crystal panel.

For reference, the present applicant has proposed a switchable lens or switchable barrier through U.S. patent application Ser. Nos. 13/077,565 and 13/325,272, Korean application 10-2010-0030531, and the like.

Figure 4:
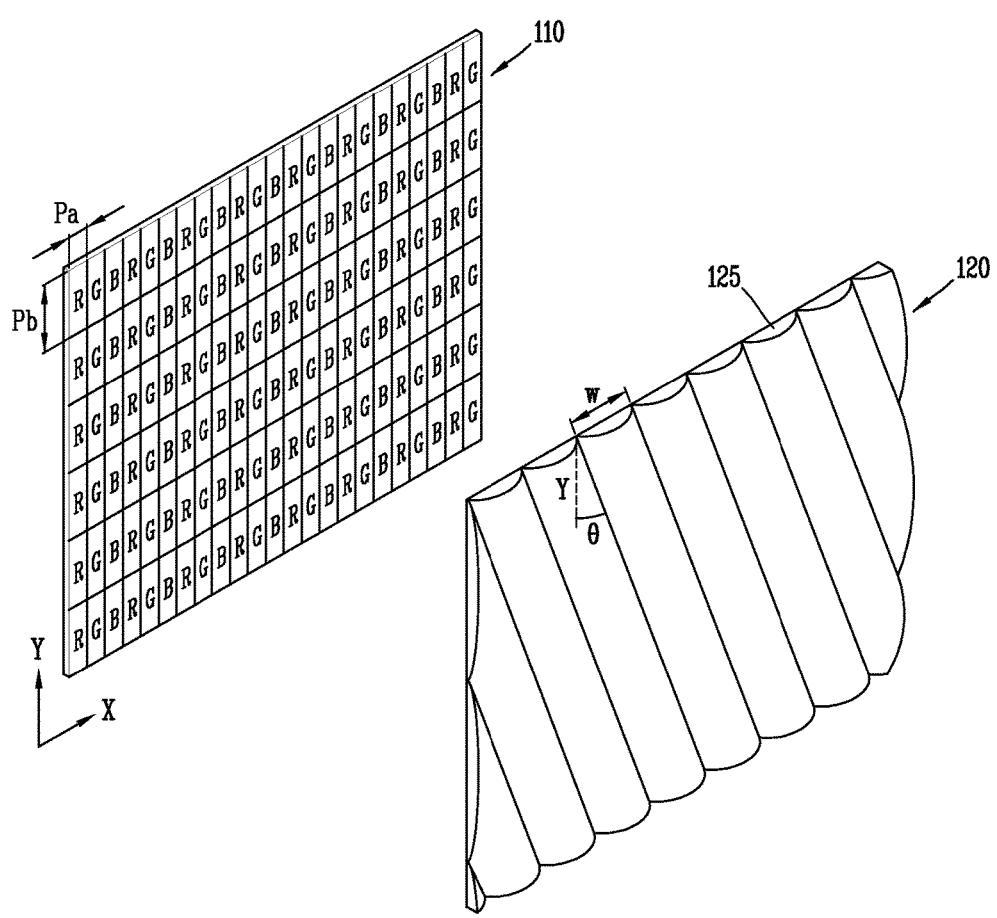
FIG. 4 is a perspective view schematically illustrating an autostereoscopic 3D display device according to one embodiment of the present disclosure.

FIG. 4 is a perspective view schematically illustrating an autostereoscopic 3D display device according to one embodiment of the present disclosure.

Referring to FIG. 4, in a lenticular lens type stereoscopic 3D display device according to one embodiment of the present disclosure, a lenticular lens sheet 120, which is a 3D filter, including a plurality of lenticular lenses 125 having a predetermined width (w) is disposed on a front surface of the image panel 110 and disposed with a plurality of sub-pixels (R, G, B).

The lenticular lens sheet 120 is formed with a plurality of lenticular lenses 125, an upper surface of which is made of a convex lens shaped material layer on a flat substrate.

The lenticular lens sheet 120 performs the role of dividing left-eye and right-eye images, and viewing diamonds (in a normal view zone) in which images corresponding to the left-eye and right-eye are formed at an optimal viewing distance (d) from the lenticular lens sheet 120 and are incident on the left-eye and right-eye, respectively.

Accordingly, an image that has transmitted through the image panel 110 passes through the lenticular lens sheet 120 to finally be directed to the viewer's left-eye and right-eye so as to provide a three-dimensional stereoscopic image.

In the lenticular lens type stereoscopic 3D display device, the image panel 110 and lenticular lens sheet 120 are supported by a mechanical body (not shown), and the image panel 110 and lenticular lens sheet 120 are separated by a predetermined distance (rear surface distance; S).

On the other hand, according to embodiments of the present disclosure, the layout of a plurality of lenticular lenses 125 is disposed in the form of being inclined at a first angle ($\Theta$) with respect to a longitudinal direction (y-axis direction) of the sub-pixels (R, G, B), and a horizontal width (w) along a transverse direction (x-axis direction) of the sub-pixels (R, G, B) of the lenticular lens 125 may be set to an integer multiple of the sub-pixels (R, G, B).

In other words, in a stereoscopic 3D display device according to embodiments of the present disclosure, the lenticular lenses 125 provided on the lenticular lens sheet 120 may be disposed to be inclined at a first angle ($\Theta$) with reference to a longitudinal direction of the sub-pixels (R, G, B).

Accordingly, the number of views for viewing a 3D image may be adjusted by the layout of the lenticular lens sheet 120 inclined with respect to the image panel 110 displaying a 2D image.

The first angle ($\Theta$) inclined with reference to the longitudinal direction of the sub-pixels (R, G, B) of the lenticular lens 125 is expressed as the equation: $\tan^{-1}((M*Pa)/(N*Pb))$.

Here, Pa is a minor axis pitch of the sub-pixels (R, G, B), and Pb is a major axis pitch of the sub-pixels (R, G, B), and M and N are natural numbers defined as a number of sub-pixels (R, G, B) in a transverse direction of the sub-pixels (R, G, B) and a number of sub-pixels (R, G, B) in a longitudinal direction of the sub-pixels (R, G, B), respectively, within a group when the lenticular lens 125 passes through a vertex of one group in a correct diagonal direction in the case where a plurality of sub-pixels (R, G, B) are configured with one group. M and N typically satisfy the relationship $M/N \leq 2$.

Here, a number given to a plurality of sub-pixels (R, G, B) located within one group denotes a number of views defined as a 3D image viewable zone of the stereoscopic 3D display device in which the lenticular lenses 125 of the lenticular lens sheet 120 is disposed at the first angle ($\Theta$), and a number given to each view is a sub-pixel (R, G, B) that is seen during 3D image viewing.

A stereoscopic 3D display device having the lenticular lens sheet 120 according to embodiments of the present disclosure may have an effect of enhancing luminance.

An increase of the number of views is carried out by applying a structure in which the lenticular lens 125 provided in the lenticular lens sheet 120 is disposed to have a predetermined angle with reference to a longitudinal direction of the sub-pixels (R, G, B), namely, a slanted structure. The application of the slanted structure may prevent resolution from being deteriorated in one direction.

In addition, according to embodiments of the present disclosure, a viewing diamond may be configured to overlap with an adjoining viewing diamond to enhance the luminance difference of a stereoscopic image, as will be described in detail with reference to the accompanying drawings.

Figure 5:
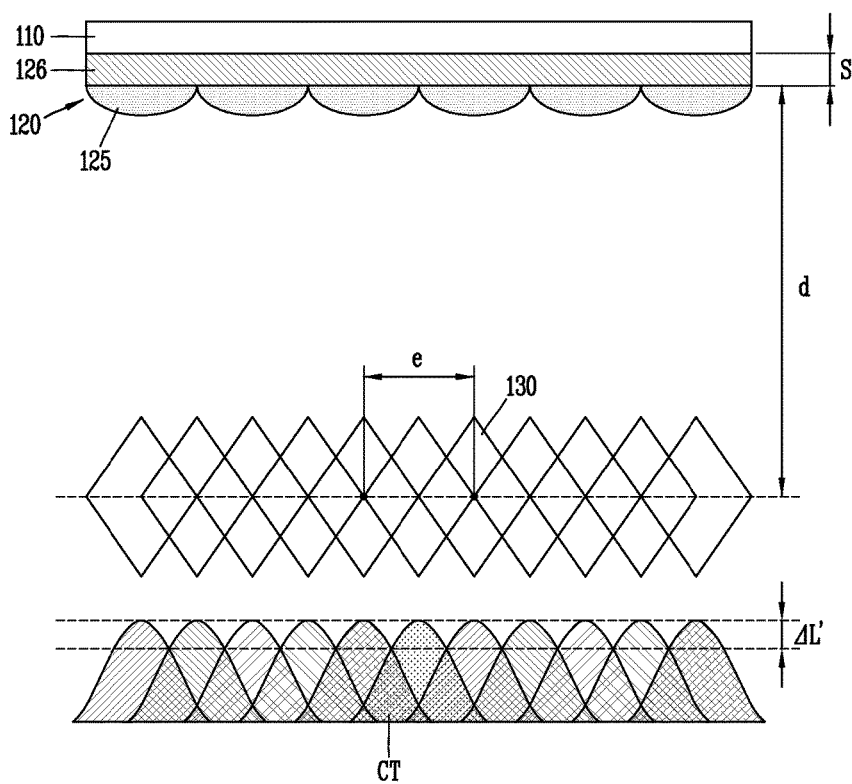
FIG. 5 is a view illustrating an autostereoscopic 3D display device and a light profile to which a view overlapping structure is applied according to one embodiment of the present disclosure, as an example.

FIG. 5 is a view illustrating an autostereoscopic 3D display device and a light profile to which a view overlapping structure is applied according to one embodiment of the present disclosure, as an example.

Here, viewing diamonds, light profiles, and view data forming a viewing zone are illustrated in FIG. 5. For reference, view data may be divided using hatching, and the same hatching denotes the same view data.

Referring to FIG. 5, an autostereoscopic 3D display device according to embodiments of the present disclosure may include an image panel 110 and a lenticular lens sheet 120 as a 3D filter located on a front surface of the image panel 110 to implement a stereoscopic image.

Here, the image panel 110 and lenticular lens sheet 120 are supported by a mechanical body (not shown), and the image panel 110 and lenticular lens sheet 120 are separated by a predetermined distance (rear surface distance; S) by an intervening layer 126, such as a gap glass.

The lenticular lens sheet 120 is formed with a plurality of lenticular lenses 125, an upper surface of which is made of a convex lens shaped material layer on a flat substrate, but the present disclosure is not limited to this.

The 3D filter may be formed in various ways using well-known technologies such as a barrier other than the lenticular lens sheet 120.

The lenticular lens sheet 120 performs the role of dividing left-eye and right-eye images, and diamond shaped viewing diamonds (in the normal view zone) 130 in which images corresponding to the left-eye and right-eye are formed at an optimal 3D viewing distance (d) from the lenticular lens sheet 120 and are incident on the left-eye and right-eye, respectively.

In other words, the lenticular lens sheet 120 may allow light emitted from each sub-pixel of the image panel 110 to finally receive different image groups at the viewer's left-eye and right-eye to form a viewing zone at an optimal viewing distance (d). The shape of the viewing zone has a typical diamond form, and thus is referred to as a viewing diamond 130.

In one embodiment, the width of a viewing diamond 130 is the size of a viewer's interocular distance (e) such that images having a disparity are incident on the viewer's left-eye and right-eye such that the viewer perceives it as a stereoscopic image.

Here, the view data, namely, image, of the corresponding sub-pixel of the image panel 110 is formed in each viewing diamond 130.

For example, when configured with nine views, each view is applied to a first through a ninth view, respectively, in the viewing diamonds 130, and the second view is relatively located at the right or left side compared to the first view, and has a directivity. The relevant view data is reflected and repeatedly formed on the viewing diamonds 130.

Here, referring to a light profile measured at an optimal viewing distance (d) as described above, it is seen that the intensity of light is the highest at the center of the viewing diamond 130 and gradually reduces towards an end of the viewing diamond 130.

In the case of the first embodiment of the present disclosure, it is seen that luminance difference ($\Delta L'$) is greatly reduced compared to the related art when the viewing diamonds 130 are configured to overlap with each other compared to a lenticular lens type stereoscopic 3D display device in the related art.

Here, a two overlapping views embodiment (where a viewing diamond 130 overlaps with two adjacent viewing diamonds) is taken as an example in FIG. 5, but the present disclosure is not limited to this, and three or more overlapping viewing diamonds may be used. Here, using two overlapping views has a structure in which another viewing diamond 130 is inserted between two adjoining viewing diamonds 130.

Here, the size and width of a light profile in each view are affected by the image panel 110, lenticular lens sheet 120, light source, optical sheet, and the like, and the size of a region overlapping with the light profile of a view corresponding to the adjoining viewing diamond 130 corresponds to 3D crosstalk (CT).

In other words, in the ideal case, only the information of one view may be seen on the viewing diamond 130 (for example, only an L-view is seen and a R-view is not seen from the left-eye), but in case of a view overlapping structure, the R-view other than the L-view may be also dimly seen from the left-eye, generating 3D crosstalk (CT).

As described above, in case of an autostereoscopic 3D display device to which a view overlapping structure is applied according to embodiments of the present disclosure, it is seen that luminance difference is greatly reduced but 3D crosstalk is increased. In other words, the luminance difference and 3D crosstalk have a trade-off relationship with each other.

Furthermore, as 3D crosstalk is increased, 3D depth perceived by a viewer is also deteriorated, blurring the image.

In this case, the view data of an adjoining view may be replaced to reduce 3D crosstalk received by the viewer, but the size, namely the width of the viewing diamond 130, is formed with the interocular distance, and thus the right-eye is affected when view data is replaced based on the left-eye, and the left-eye is affected when view data is replaced based on the right-eye.

As a result, according to embodiments of the present disclosure, the width of a viewing diamond 130 is set to a/n times of the interocular distance (where a and n are natural numbers satisfying the condition: a<n). Thus, the width of the viewing diamond 130 is less than the interocular distance (hereinafter, referred to as an NVD technology) while at the same time the viewing diamonds are overlapped with each other, as will be described in detail below, with reference to the accompanying drawings.

In general, a viewing distance d of a stereoscopic 3D display device is determined by a size of the image panel 110 of the stereoscopic 3D display device. In one embodiment, the viewing distance is 2.5H-3H, where H is a height of the image panel 110.

There are largely two methods for reducing the width of a viewing diamond 130 at the same viewing distance to be less than the interocular distance. One method is to increase the rear surface distance to reduce the width of a viewing diamond.

The other method involves fine-tuning by reducing the lens pitch without altering the view mapping to reduce the width of a viewing diamond 130, as disclosed in Korean application 10-2014-0120366 or the like filed by the present applicant.

Figure 6:
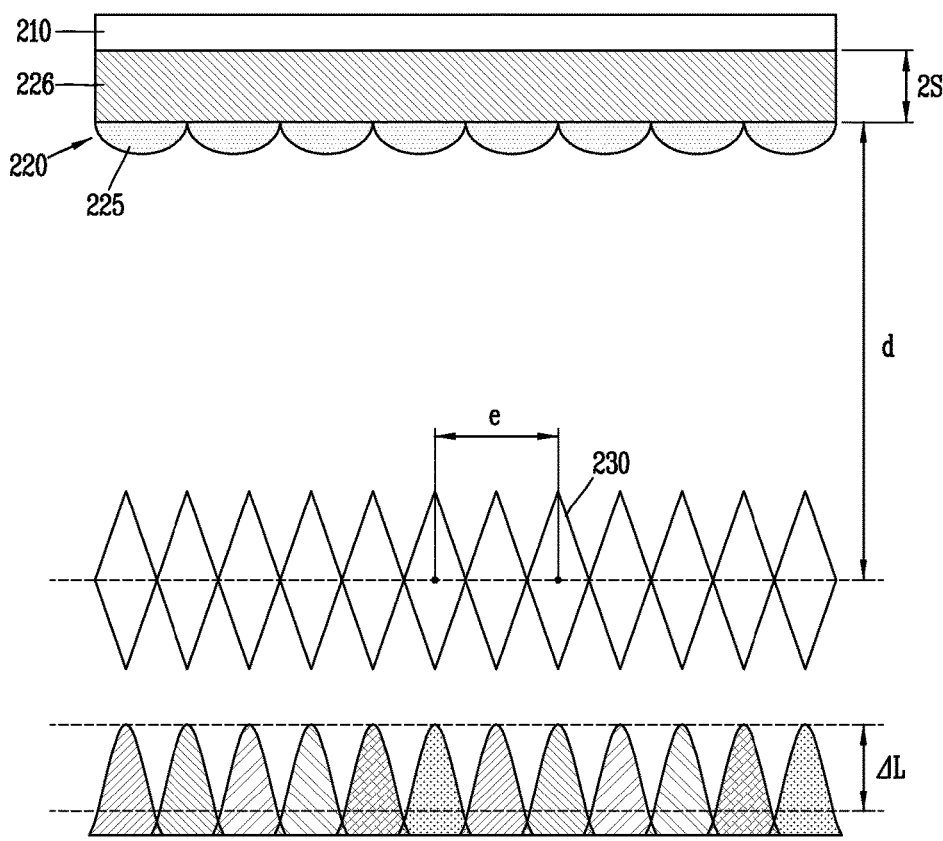
FIG. 6 is a view illustrating an autostereoscopic 3D display device and a light profile to which an NVD technology is applied according to one embodiment of the present disclosure, as an example.

FIG. 6 is a view illustrating an autostereoscopic 3D display device and a light profile to which NVD (narrow viewing diamond) technology is applied according to embodiments of the present disclosure, as an example, in which the width of a viewing diamond 230 is set to half of the interocular distance.

Figure 7:
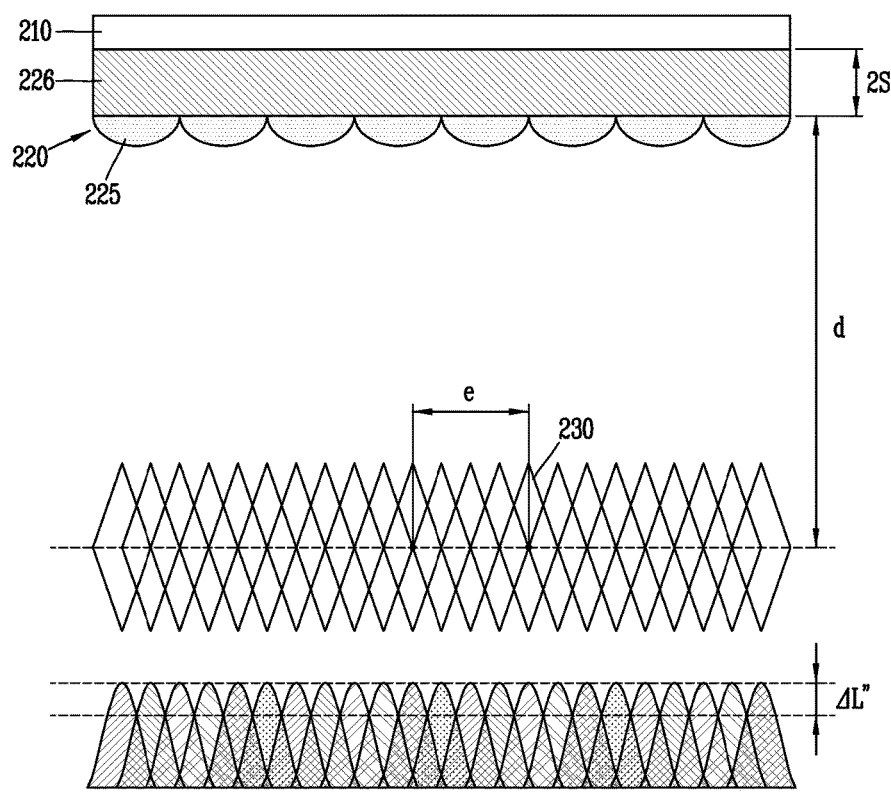
FIG. 7 is a view illustrating an autostereoscopic 3D display device and a light profile to which an NVD technology and a view overlapping structure are applied according to one embodiment of the present disclosure, as an example.
Figure 8:
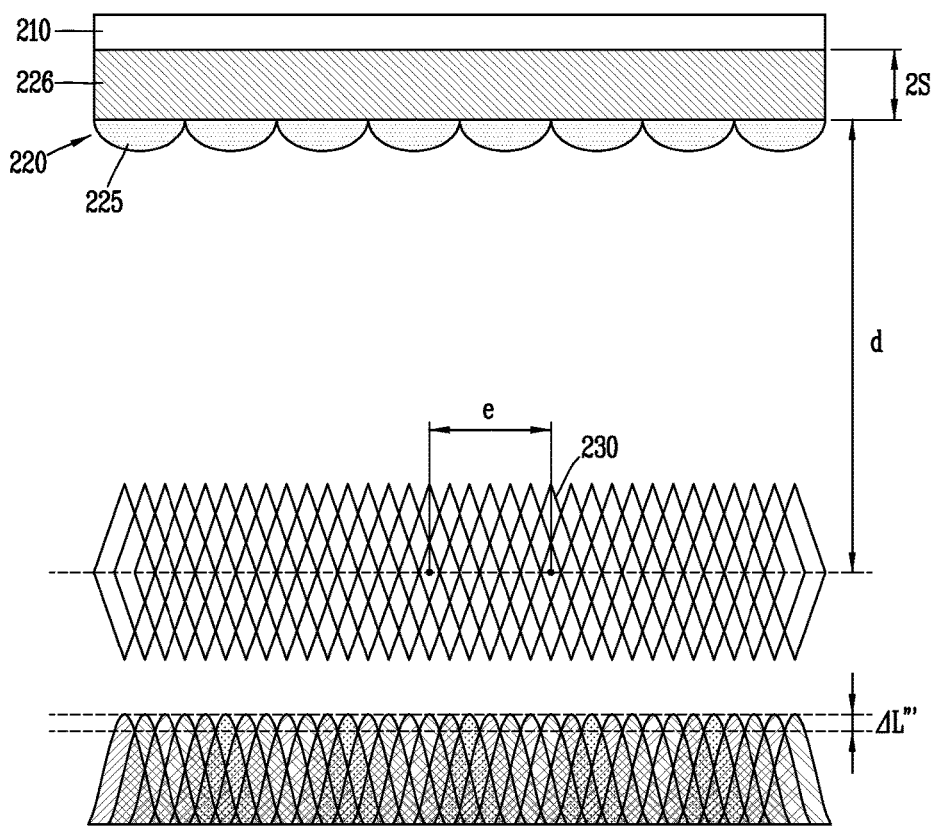
FIG. 8 is another view illustrating an autostereoscopic 3D display device and a light profile to which an NVD technology and a view overlapping structure are applied according to one embodiment of the present disclosure, as an example.

Furthermore, FIGS. 7 and 8 are views illustrating an autostereoscopic 3D display device and a light profile to which an NVD technology and a view overlapping structure are applied according to embodiments of the present disclosure, as an example.

Here, FIGS. 7 and 8 illustrate a two overlapping views structure and a three overlapping views structure, respectively, as an example.

As described above, viewing diamonds 230, light profiles, and view data forming a viewing zone are illustrated in FIGS. 6, 7, and 8. For reference, view data may be divided using hatching, and the same hatching denotes the same view data.

Referring to FIGS. 6, 7 and 8, an autostereoscopic 3D display device according to embodiments of the present disclosure may include an image panel 210 and a lenticular lens sheet 220 as a 3D filter located on a front surface of the image panel 210 to implement a stereoscopic image.

Here, the image panel 210 and lenticular lens sheet 220 are supported by a mechanical body (not shown), and the image panel 210 and lenticular lens sheet 220 may be separated by a predetermined distance (rear surface distance; 2S) by an intervening layer 226, such as a gap glass.

The lenticular lens sheet 220 is formed with a plurality of lenticular lenses 225, an upper surface of which is made of a convex lens shaped material layer on a flat substrate, but the present disclosure is not limited to this.

The 3D filter may be formed in various ways using well-known technologies such as a barrier other than the lenticular lens sheet 220.

The lenticular lens sheet 220 performs the role of dividing left-eye and right-eye images, and diamond shaped viewing diamonds (in a normal view zone) 230 in which images corresponding to the left-eye and right-eye are formed at an optimal 3D viewing distance (d) from the lenticular lens sheet 220 and are incident on the left-eye and right-eye, respectively.

Here, the width of a viewing diamond 230 according to embodiments of the present disclosure may be set to half of the viewer's interocular distance (e) according to the application of an NVD technology.

However, the present disclosure is not limited to this, and the width of the viewing diamond 230 may be also set to a/n times of the interocular distance (where a and n are natural numbers satisfying the condition: a<n) to be less than the interocular distance (e).

Through this, a mutual influence between the viewing diamonds 230 located at both of the viewer's eyes may be decreased to eliminate or reduce 3D crosstalk.

In order to reduce the width of the viewing diamond 230 at the same viewing distance (d) to be less than the interocular distance (e), according to embodiments of the present disclosure, the width of the second rear surface (intervening layer) may be increased compared to the related art. Here, there is a trade-off relationship in which as the width of the viewing diamond 230 at the same viewing distance (d) is decreased to ½, ⅓, ¼, . . . , 1/n of the interocular distance, the rear surface distance may be increased to 2, 3, 4, . . . , n times that which would be required for the viewing diamond to have a width equal to the interocular distance. In other words, the width of the other intervening layer is the product of the reciprocal of a proper fraction (interocular distance/width of viewing diamond) and a base thickness of the second rear surface, where n is a natural number At the same time, embodiments of the present disclosure may be configured to overlap two or three viewing diamonds 230. Through this, the luminance difference (ΔL", ΔL") due to the viewer's location movement may be also reduced.

Here, the view data, namely, image, of the corresponding sub-pixel of the image panel 210, is formed in each viewing diamond 230.

For example, when configured with nine views, each view is applied to a first through a ninth view, respectively, in the viewing diamonds 230, and the second view is relatively located at the right or left side compared to the first view, and has a directivity. The relevant view data is reflected and repeatedly formed on the viewing diamonds 230.

Here, referring to a light profile measured at an optimal viewing distance (d), as described above, it is seen that the intensity of light is the highest at the center of the viewing diamond 230 and gradually reduces towards an end of the viewing diamond 230.

In embodiments of the present disclosure, by increasing an overlapping number of viewing diamonds 230 to two or three, as illustrated in FIGS. 7 and 8, respectively, it is seen that the luminance difference (ΔL", ΔL") is greatly reduced.

Furthermore, when a light source having the same characteristics is used, an interference between the viewing diamonds 230 is reduced, and thus a totally accumulated 3D crosstalk is relatively reduced compared to the foregoing case of FIG. 5.

Since the present disclosure uses an NVD technology as described above, it may be possible to reduce luminance difference, perceived 3D crosstalk, and image flipping.

Furthermore, an autostereoscopic 3D display device according to embodiments of the present disclosure may eliminate the need for a multi-view converter for implementing a multi-view, thereby eliminating image quality deterioration due to the multi-view converter as well as reducing the cost.

Furthermore, an autostereoscopic 3D display device according to embodiments of the present disclosure may be configured with a view structure capable of adjusting the balance of red, green, and blue based on the nearest same view. Furthermore, view data rendering may be applied to overlap part of a 2D zone to extend a 3D viewing zone, as will be described in detail below, with reference to the accompanying drawings.

Figure 9:
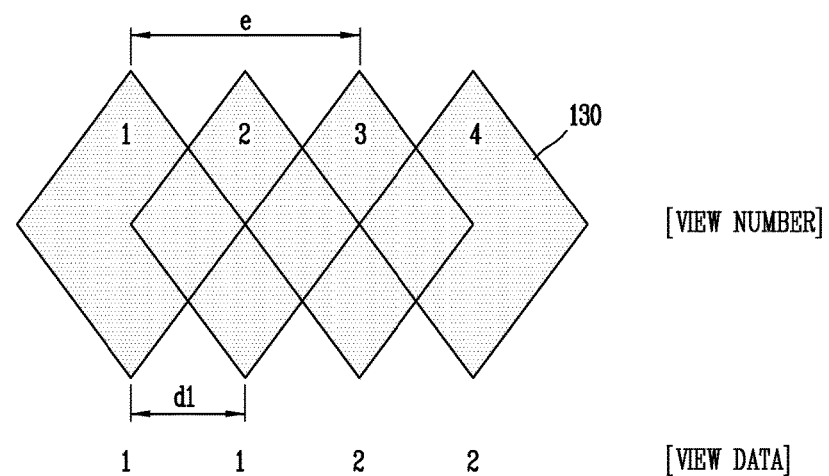
FIG. 9 is a view illustrating a view structure and view data of an autostereoscopic 3D display device according to a first embodiment of the present disclosure, as an example.

FIG. 9 is a view illustrating a view structure and view data of an autostereoscopic 3D display device according to a first embodiment of the present disclosure, as an example.

Here, FIG. 9 illustrates a view structure and view data of an autostereoscopic 3D display device to which a NVD technology is not applied, as an example. Furthermore, FIG. 9 illustrates a four-view, two overlapping views structure, as an example.

Referring to FIG. 9, the number of views is four at this time, and a NVD technology is not applied, and thus the view distance (d1) corresponds to half of the interocular distance (e), namely, 32.5 mm.

In other words, since the size of the viewing diamond 130 is the same as an interocular distance (e), and a two overlapping views structure is applied thereto, the view distance (d1) corresponds to half of the interocular distance (e).

Since an autostereoscopic 3D display device according to the first embodiment of the present disclosure has a two overlapping views structure, as described above, sub-pixels of two views are perceived by a single eye of the viewer. Accordingly, when the left eye perceives a first view and a second view, the right eye perceives a third view and a fourth view.

Here, first view data (i.e., a first view image) may be received at the first view and the second view of the image panel, and second view data (i.e., a second view image) may be received at the third view and the fourth view of the image panel.

Figure 10:
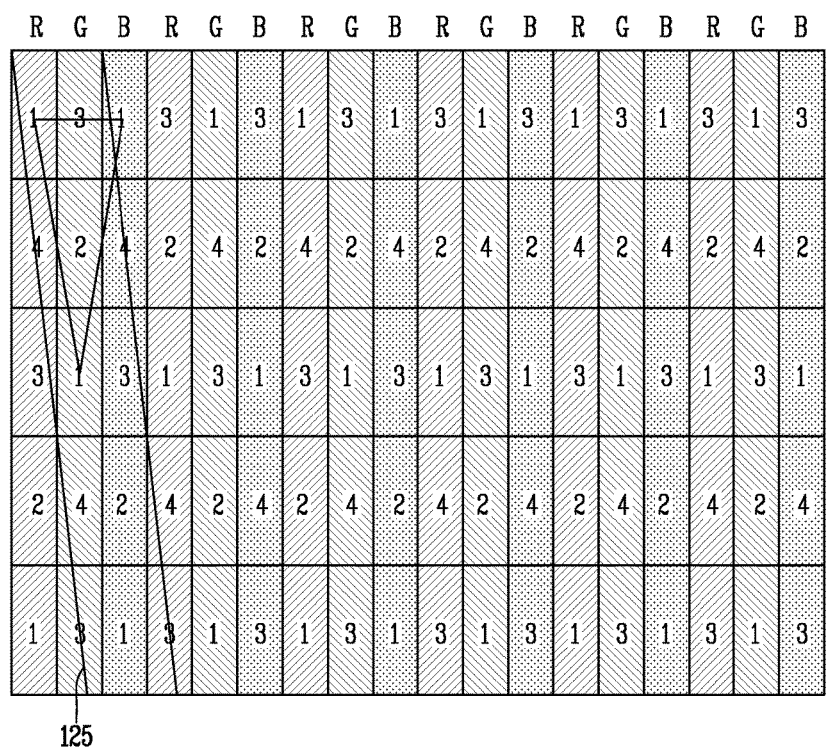
FIG. 10 is a view illustrating a pixel array and lenticular lens layout written with a view map in an autostereoscopic 3D display device according to the first embodiment of the present disclosure, as an example.

FIG. 10 is a view illustrating a pixel array and lenticular lens layout written with a view map in an autostereoscopic 3D display device according to the first embodiment of the present disclosure, as an example.

Here, FIG. 10 illustrates a pixel array using four views, as an example. However, the present disclosure is not limited to the foregoing number of views.

Here, R, G, and B indicated at the top of FIG. 10 indicate the location of R, G, and B sub-pixels.

Figure 11:
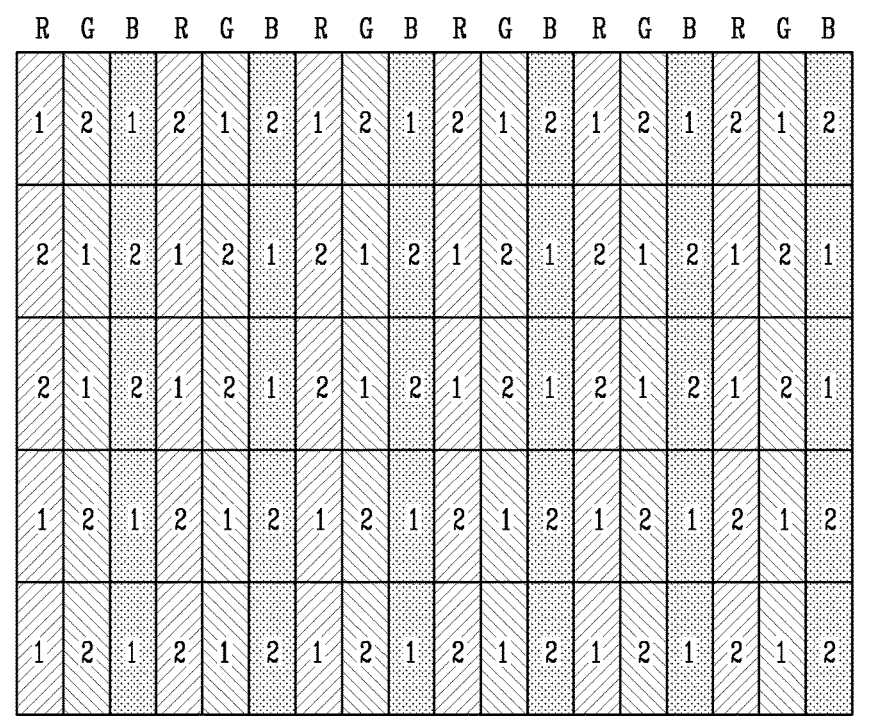

FIG. 11 is a view illustrating input data input to the pixel array illustrated in FIG. 10 as an example, in which a stereo type image (i.e., a 2-view image) data according to embodiments of the present disclosure is shown. Accordingly, numerical values 1 and 2 illustrated in FIG. 11 indicate a first view image and a second view image, respectively.

According to an autostereoscopic 3D display device based on an interocular distance to which an NVD technology is applied, a view structure allowing the input and output of stereo type image data may be implemented in various ways according to a number of views, an overlapping number of views, an inclined angle of lens, and the like.

Referring to FIG. 10, when m views are used (where m is a natural number), the image panel may allocate a first view through an m-th view to m sub-pixels in the unit of m sub-pixels.

In other words, a k-th view is allocated to a k-th sub-pixel among m sub-pixels (where k is a natural number satisfying the condition: 1≤k≤m).

For an example, when four views are used, a first view is allocated to a first sub-pixel, a second view is allocated to a second sub-pixel, a third view is allocated to a third sub-pixel, and a fourth view is allocated to a fourth sub-pixel.

To this end, the 3D filter may be implemented with a lenticular lens 125 having a slanted structure formed to be inclined at a predetermined angle with respect to the sub-pixels. More specifically, the lenticular lens 125 having a slanted structure is formed to be inclined by a predetermined angle with respect to a major axis side of the sub-pixels.

For reference, the view map described in the present disclosure expresses the data sequence and location of each view repeatedly mapped to the sub-pixels of the image panel, and the viewing zone may include a normal view zone, a reversed view zone, and a view disable zone.

Here, the normal view zone is a zone in which a viewer is able to view a stereoscopic image in a normal mode, meaning a zone in which a right-eye image is formed on the viewer's right-eye and a left-eye image is formed on the viewer's left-eye.

Furthermore, a reversed view zone is a zone in which the viewer quickly feels fatigue since a left-eye image is formed on the right-eye and a right-eye image is formed on the left-eye though the viewer perceives an image in a stereoscopic manner.

In addition, the view disable zone refers to a zone in which the viewing of a stereoscopic image is disabled.

In other words, a view map may include coordinate information (i.e., a first view through an m-th view) on positions displayed with the foregoing three types of zones.

However, coordinate information on the view disable zone may be omitted on the view map since a zone excluding the normal view zone and reversed view zone is determined as a view disable zone.

In case of a stripe or slanted structure with no overlapping viewing diamonds in a two-view structure in the related art as described above, the viewing zone width is approximately an interocular distance (about 65 mm), and luminance difference occurs.

As a result, the number of views should be extended to secure a viewing zone, and viewing diamonds should be also overlapped with each other to reduce or eliminate luminance difference while maintaining output data in a stereo type.

Accordingly, a four-view, two-overlapping views structure, six-view, three-overlapping views structure, or the like may be applicable thereto. However, a trade-off relationship is formed in which 3D crosstalk increases as the number of views and overlapping number of views are increased.

Referring to FIG. 10 again, a view map and the layout of lenticular lenses 125 are repeatedly applied over the entire image panel.

Here, when the nearest same views are connected with a straight line, it is seen that red, green, and blue are configured to have the balance.

Referring to FIG. 11, sub-pixels perceived by a single eye of the viewer are input by two views due to a two overlapping views structure. Accordingly, when the left eye perceives a first view and a second view, the right eye perceives a third view and a fourth view.

Here, first view data (i.e., a first view image) may be input to a first view and a second view of the image panel, and second view data (i.e., a second view image) may be input to a third view and a fourth view of the image panel. In this case, the viewer's left eye perceives a first view image and the viewer's right eye perceives a second view image to generate a binocular disparity so as to view a stereoscopic image.

For another example, when third view data (i.e., a third view image) is input to a third view and a fourth view of the image panel, the viewer's left eye perceives a first view and the viewer's right eye perceives a third view. In this case, a depth between objects perceived by the viewer increases when compared to the foregoing example.

Such a method of converting data between views to allow the viewer to perceive 3D is referred to as view data rendering.

When four views are used as described above, a first view image through a fourth view image may be input due to a two overlapping views structure of viewing diamonds, but input data are overlapped by two (meaning two adjacent views have the same view image) to maintain a stereo type. Accordingly, only a first view and a second view image are input to reduce a difference between images perceived within a single eye, thereby reducing perceived 3D crosstalk.

Figure 12A:
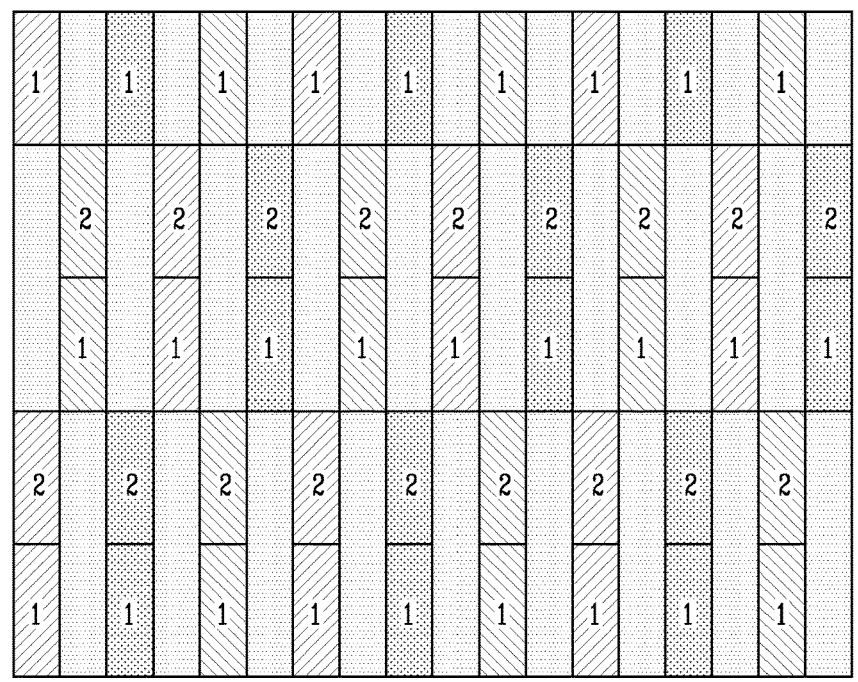
FIGS. 12A and 12B are views illustrating sub-pixels and views perceived from the left-eye and right-eye in an autostereoscopic 3D display device according to the first embodiment of the present disclosure, as an example.
Figure 12B:
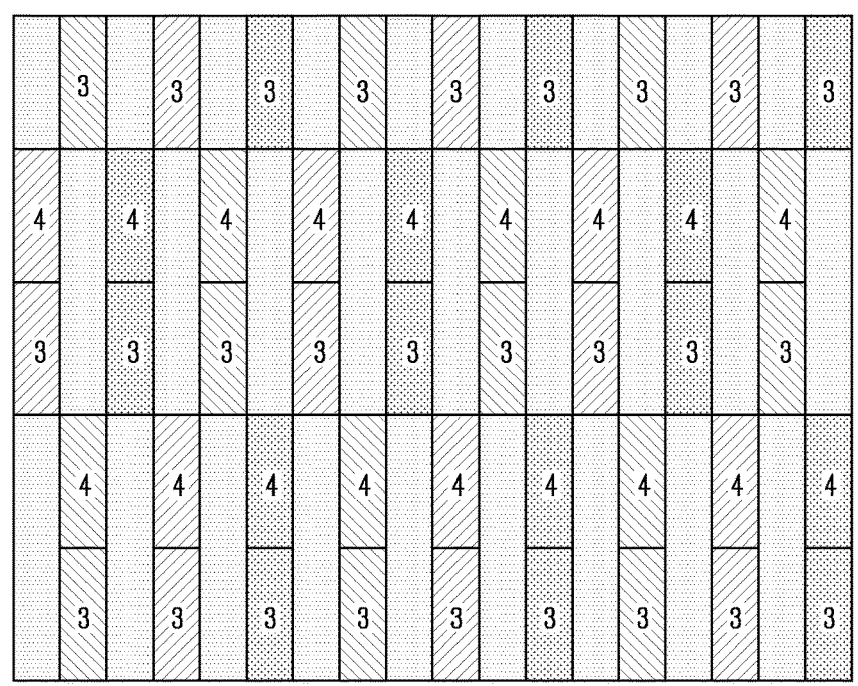

FIGS. 12A and 12B are views illustrating sub-pixels and views perceived from the left-eye and right-eye in an autostereoscopic 3D display device according to the first embodiment of the present disclosure, as an example.

Figure 13A:
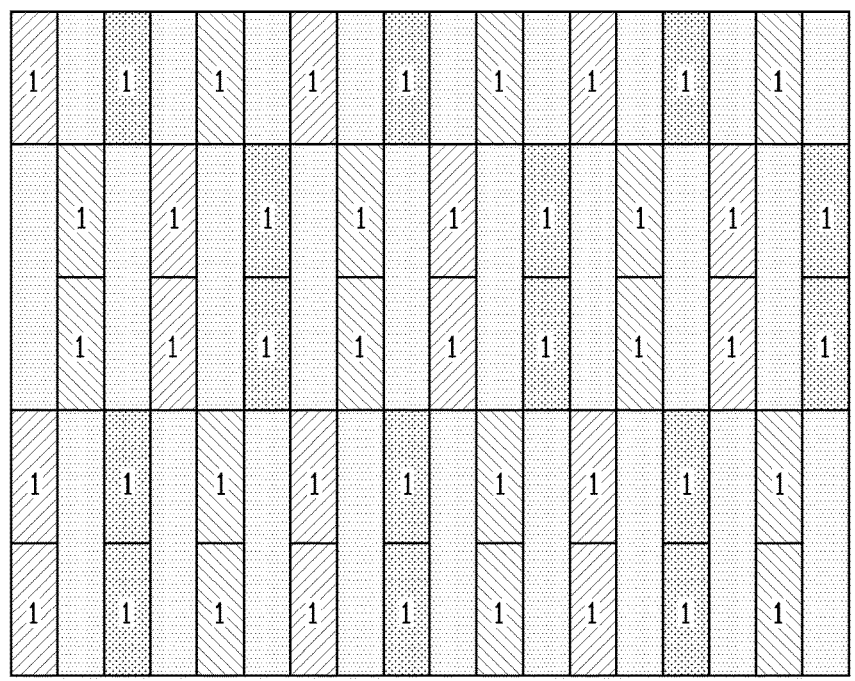
FIGS. 13A and 13B are views illustrating input data perceived from the left-eye and right-eye in an autostereoscopic 3D display device according to the first embodiment of the present disclosure, as an example.
Figure 13B:
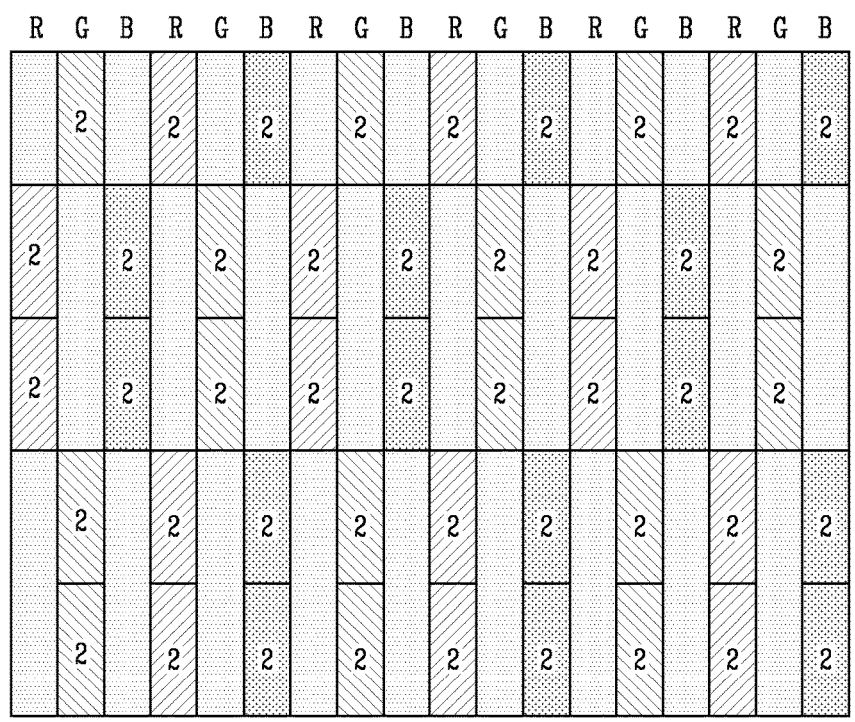

Furthermore, FIGS. 13A and 13B are views illustrating input data perceived from the left-eye and right-eye in an autostereoscopic 3D display device according to the first embodiment of the present disclosure, as an example.

Here, FIGS. 12A and 13A illustrate sub-pixels, views, and input data perceived from the left-eye, as an example, and FIGS. 12B and 13B illustrate sub-pixels, views, and input data perceived from the right-eye, as an example.

Figure 14:
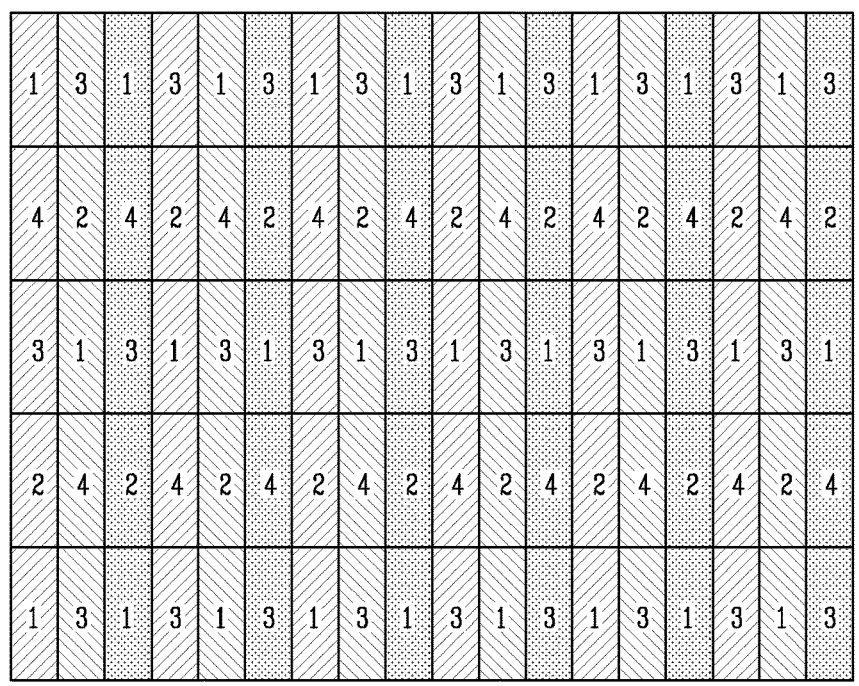
FIG. 14 is a view illustrating sub-pixels perceived by both eyes in an autostereoscopic 3D display device according to the first embodiment of the present disclosure, as an example.
Figure 15:
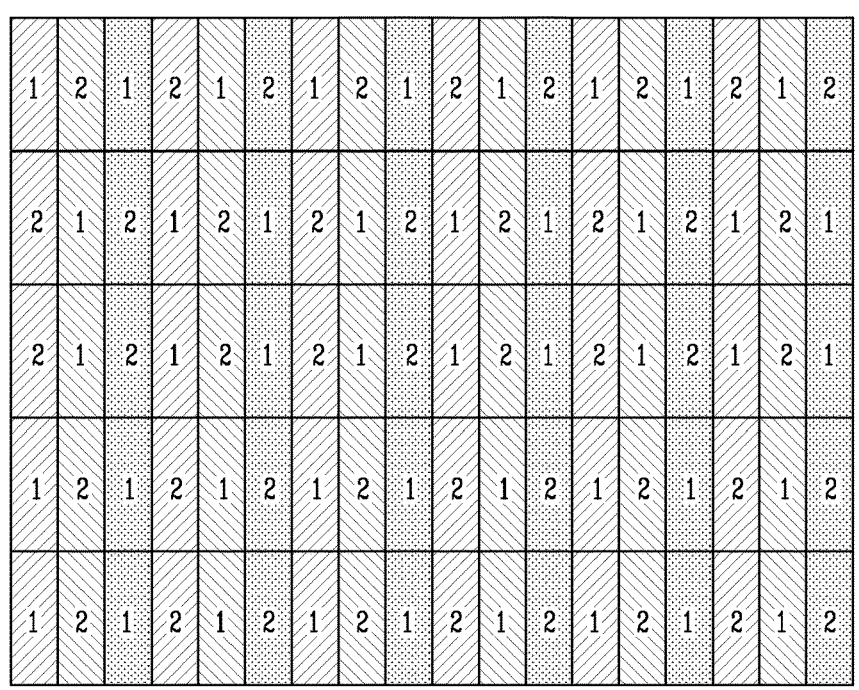
FIG. 15 is a view illustrating input data perceived by both eyes in an autostereoscopic 3D display device according to the first embodiment of the present disclosure, as an example.

FIGS. 14 and 15 are views illustrating sub-pixels and input data perceived by both eyes in an autostereoscopic 3D display device according to the first embodiment of the present disclosure, as an example.

In an ideal case where there is no 3D crosstalk between adjoining views, the number of views perceived by a viewer on two overlapping viewing diamonds is two, based on a single eye. Accordingly, sub-pixels perceived by the left-eye and right-eye may be expressed as illustrated in FIGS. 12A and 12B.

Here, in an autostereoscopic 3D display device according to the first embodiment of the present disclosure illustrated in FIG. 5, the width of a viewing diamond is based on the interocular distance, and thus when the left-eye perceives a first view, the right-eye perceives a second view if there are no overlapping viewing diamonds.

Accordingly, as one viewing diamond further exists between the left-eye and right-eye in the case of a two overlapping views structure, when the left-eye perceives a first view, the right-eye perceives a third view, as illustrated in FIGS. 12A and 12B (refer to FIG. 14 for the case of both eyes).

In this case, it is seen that a sub-pixel perceived from the left-eye is adjacent to a sub-pixel perceived from the right-eye.

Here, when a view data rendering technology according to the present disclosure is applied, in the case using two overlapping views, when the left-eye views a first view image, the right-eye views a second view image, as illustrated in FIGS. 13A and 13B (refer to FIG. 15 for the case of both eyes).

Figures 16, 17:
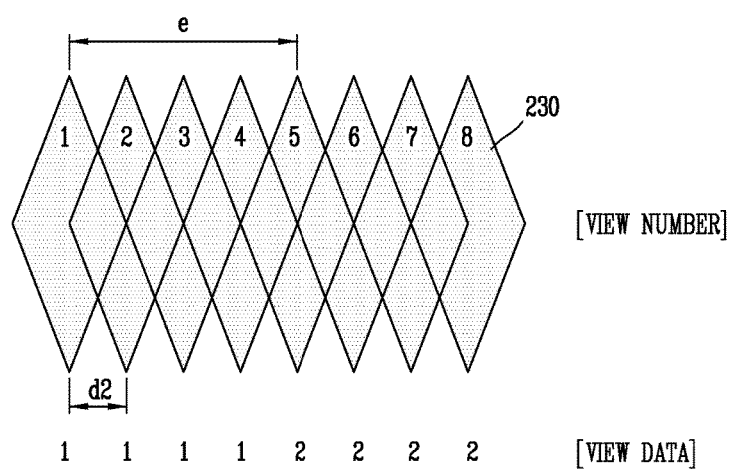
FIG. 16 is a view illustrating images and 3D viewing zones perceived from the left-eye and right-eye in an autostereoscopic 3D display device according to the first embodiment of the present disclosure, as an example.
FIG. 17 is a view illustrating a view structure and view data of an autostereoscopic 3D display device according to a second embodiment of the present disclosure, as an example.

FIG. 16 is a view illustrating images and 3D viewing zones perceived from the left-eye and right-eye in an autostereoscopic 3D display device according to the first embodiment of the present disclosure, as an example.

Referring to FIG. 16, as described above, first view data (i.e., a first view image) may be input to a first view and a second view of the image panel, and second view data (i.e., a second view image) may be input to a third view and a fourth view of the image panel.

In this case, the viewer's left eye perceives a first view image and the viewer's right eye perceives a second view image to generate a binocular disparity so as to view a stereoscopic image. At this time, when the viewer moves to locate the viewer's left eye at a third view or fourth view zone, the viewer's left eye perceives a second view and the viewer's right eye perceives a first view to see an reversed stereoscopic image.

Here, when a 3D viewing zone is defined as a zone between reversed stereoscopic images, each zone is equal in width to the interocular distance, as illustrated in FIG. 16. In other words, a ratio of normal view zone corresponds to 50% of the entire zone.

Next, a second embodiment and a third embodiment of the present disclosure in which a 3D viewing zone is extended by applying an NVD technology will be described in detail, with reference to the accompanying drawings.

FIG. 17 is a view illustrating a view structure and view data of an autostereoscopic 3D display device according to a second embodiment of the present disclosure, as an example.

Here, FIG. 17 illustrates a view structure and view data of an autostereoscopic 3D display device to which an NVD technology is applied, as an example. Furthermore, FIG. 17 illustrates an eight-view, two-overlapping views structure, as an example. However, the present disclosure is not limited to such a number of views and number of overlapping views.

Referring to FIG. 17, the number of views is eight at this time, and an NVD technology is applied, and thus the view distance (d2) corresponds to quarter of the interocular distance (e), namely, 16.25 mm.

In other words, when the size of the viewing diamond 230 is set to half of the interocular distance (e) (hereinafter, referred to as "NVD ½-based" for the sake of convenience of explanation) and a two overlapping views structure is applied thereto, the view distance (d2) corresponds to quarter of the interocular distance (e).

Since an autostereoscopic 3D display device according to the second embodiment of the present disclosure has a two overlapping views structure, as described above, sub-pixels perceived by a single eye of the viewer correspond to four views. In other words, when the viewer is located at an optimal viewing distance, four viewing diamonds 230 are formed between the left-eye and right-eye. Accordingly, an NVD ½-based embodiment with the same conditions as that of an interocular distance based four-view, two-overlapping views structure may include eight-views with a two-overlapping views structure, and the resulting view map is as shown in FIG. 18.

In this case, when the left eye perceives a first view, a second view, a third view, and a fourth view, the right eye perceives a fifth view, a sixth view, a seventh view, and an eighth view.

Here, first view data (i.e., a first view image) may be input to a first view, a second view, a third view, and a fourth view of the image panel, and second view data (i.e., a second view image) may be input to a fifth view, a sixth view, a seventh view, and an eighth view of the image panel.

Figure 18:
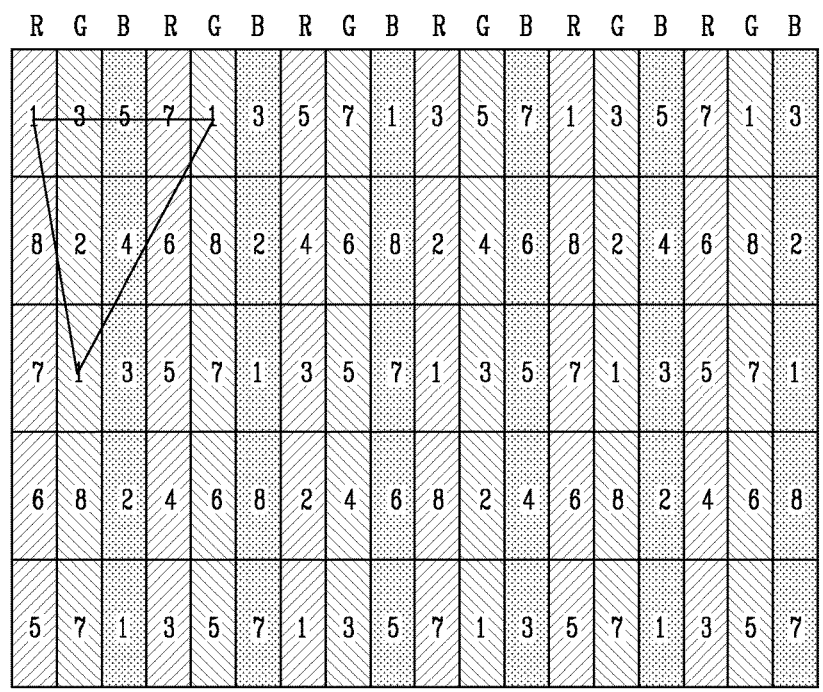
FIG. 18 is a view illustrating a pixel array written with a view map in an autostereoscopic 3D display device according to the second embodiment of the present disclosure, as an example.

FIG. 18 is a view illustrating a pixel array written with a view map in an autostereoscopic 3D display device according to the second embodiment of the present disclosure, as an example.

Here, FIG. 18 illustrates a pixel array in the case where eight views are used, as an example. However, the present disclosure is not limited to the foregoing number of views.

Here, R, G, and B indicated at the top of FIG. 18 indicate the location of R, G, and B sub-pixels.

Referring to FIG. 18, when eight views are used, as an example, a first view is allocated to a first sub-pixel, a second view is allocated to a second sub-pixel, a third view is allocated to a third sub-pixel, and a fourth view is allocated to a fourth sub-pixel. A fifth view is allocated to a fifth sub-pixel, a sixth view is allocated to a sixth sub-pixel, a seventh view is allocated to a seventh sub-pixel, and an eighth view is allocated to an eighth sub-pixel.

To this end, the 3D filter may be implemented with a lenticular lens (not shown) having a slanted structure formed to be inclined at a predetermined angle with respect to the sub-pixels.

Here, a view map and the layout of lenticular lenses are repeatedly applied over the entire image panel.

Here, when the nearest same views are connected with a straight line, it is seen that red, green, and blue are not uniform, and a specific color is repeatedly shown twice.

When a stereoscopic 3D display device is formed with the foregoing structure, image quality deterioration may occur due to horizontal lines, vertical lines, other color defects, and the like based on the layout.

Accordingly, a third embodiment of the present disclosure forms a view map and 3D filter with a modified format as follows.

Figure 19:
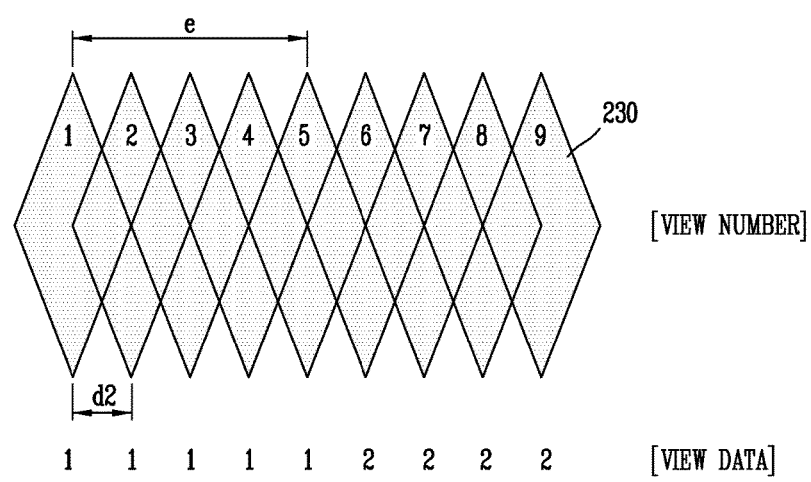
FIG. 19 is a view illustrating another view structure and view data of an autostereoscopic 3D display device according to a third embodiment of the present disclosure, as an example.

FIG. 19 is a view illustrating another view structure and view data of an autostereoscopic 3D display device according to the third embodiment of the present disclosure, as an example.

Here, FIG. 19 illustrates a view structure and view data of an autostereoscopic 3D display device to which an NVD technology is applied, as an example. Furthermore, contrary to the foregoing embodiment of FIG. 17, FIG. 19 illustrates a nine-view, 2-overlapping views structure, as an example. In other words, one view is further added and configured with a nine-view structure when compared to the foregoing embodiment of FIG. 17. However, the present disclosure is not limited to such a number of views and overlapping number of views.

Referring to FIG. 19, the number of views is nine at this time, and an NVD technology is applied, and thus the view distance (d2) corresponds to quarter of the interocular distance (e), namely, 16.25 mm, because the NVD technology the same as that of FIG. 17 is applied thereto.

In other words, when the size of the viewing diamond 230 is set to half of the interocular distance (e) and a two overlapping views structure is applied thereto, the view distance (d2) corresponds to quarter of the interocular distance (e).

Since an autostereoscopic 3D display device according to the third embodiment of the present disclosure has a two overlapping views structure, as described above, sub-pixels perceived by a single eye of the viewer correspond to four views. In other words, when the viewer is located at an optimal viewing distance, four viewing diamonds 230 are formed between the left-eye and right-eye.

Here, when the viewer's left eye is located at a first view zone, the right eye is located at a fifth view zone. Furthermore, when the viewer's left eye is located at a fifth view zone, the right eye is located at a ninth view zone.

In this case, when the left eye perceives a first view, a second view, a third view, and a fourth view, the right eye perceives a fifth view, a sixth view, a seventh view, and an eighth view.

Here, for example, first view data (i.e., a first view image) may be input to a first view, a second view, a third view, a fourth view, and a fifth view of the image panel, and second view data (i.e., a second view image) may be input to a sixth view, a seventh view, an eighth view, and a ninth view of the image panel.

Figure 20:
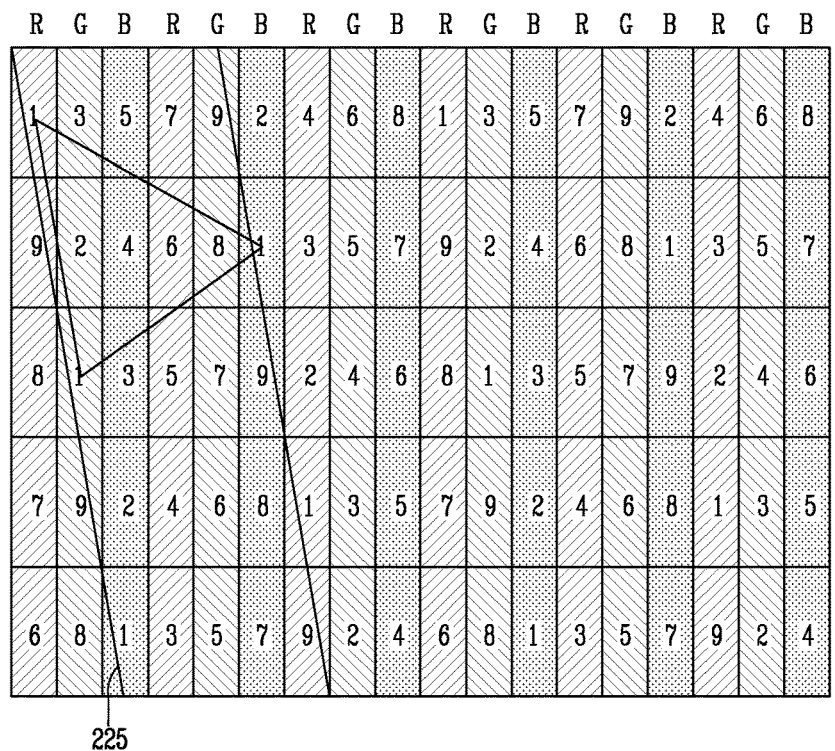
FIG. 20 is a view illustrating a pixel array and lenticular lens layout written with a view map in an autostereoscopic 3D display device according to the third embodiment of the present disclosure illustrated in FIG. 19, as an example.

FIG. 20 is a view illustrating a pixel array and lenticular lens layout written with a view map in an autostereoscopic 3D display device according to the third embodiment of the present disclosure illustrated in FIG. 19, as an example.

Here, FIG. 20 illustrates a pixel array in the case where nine views are used, as an example. However, the present disclosure is not limited to the foregoing number of views.

Here, R, G, and B indicated at the top of FIG. 20 indicate the location of R, G, and B sub-pixels.

Figure 21:
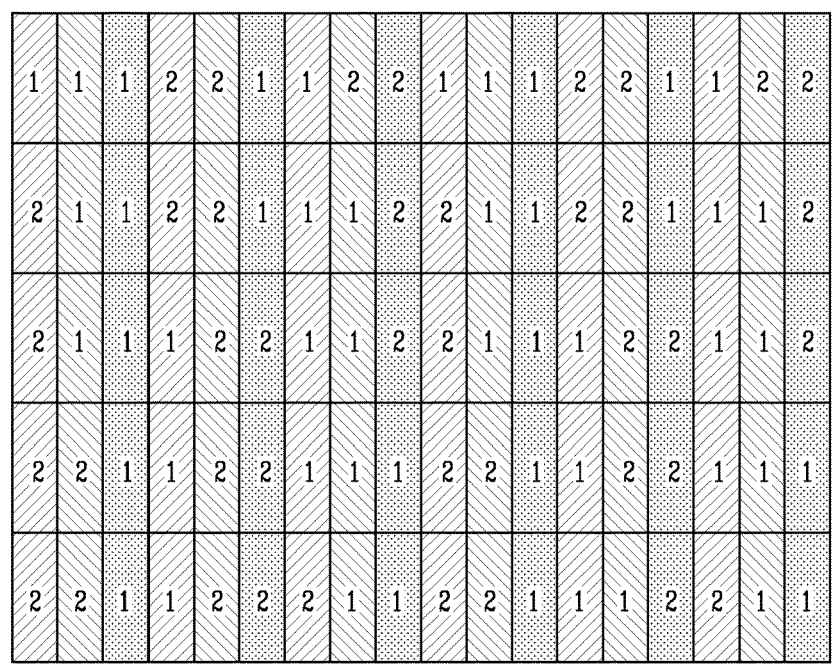
FIG. 21 is a view illustrating input data input to a pixel array illustrated in FIG. 19, as an example.

FIG. 21 is a view illustrating input data input to the pixel array illustrated in FIG. 19, as an example, in which stereo type image (i.e., 2-view image) data is shown. Accordingly, numerical values 1 and 2 illustrated in FIG. 21 indicate a first view image and a second view image, respectively.

Referring to FIG. 20, when m views are used (where m is a natural number), the image panel may allocate a first view through an m-th view to m sub-pixels in the unit of m sub-pixels.

In other words, a k-th view is allocated to a k-th sub-pixel among m sub-pixels (where k is a natural number satisfying the condition: 1≤k≤m).

For example, when nine views are used, a first view is allocated to a first sub-pixel, a second view is allocated to a second sub-pixel, and a third view is allocated to a third sub-pixel. Furthermore, a fourth view is allocated to a fourth sub-pixel, a fifth view is allocated to a fifth sub-pixel, and a sixth view is allocated to a sixth sub-pixel. Furthermore, a seventh view is allocated to a seventh sub-pixel, an eighth view is allocated to an eighth sub-pixel, and a ninth view is allocated to a ninth sub-pixel.

To this end, the 3D filter may be implemented with a lenticular lens 225 having a slanted structure formed to be inclined at a predetermined angle with respect to the sub-pixels. More specifically, the lenticular lens 225 having a slanted structure is formed to be inclined by a predetermined angle with respect to a major axis side of the sub-pixels.

Here, a view map and the layout of lenticular lenses 225 are repeatedly applied over the entire image panel.

Here, when the nearest same views are connected with a straight line, it is seen that red, green, and blue are configured to have the balance, unlike in FIG. 18.

Referring to FIG. 21, sub-pixels perceived by a single eye of the viewer correspond to four views due to an NVD ½-based two overlapping views structure. Accordingly, when the left eye perceives a first view, a second view, a third view, and a fourth view, the right eye perceives a fifth view, a sixth view, a seventh view, and an eighth view.

Here, first view data (i.e., a first view image) may be input to a first view, a second view, a third view, a fourth view, and a fifth view of the image panel, and second view data (i.e., a second view image) may be input to a sixth view, a seventh view, an eighth view, and a ninth view of the image panel. In this case, so long as the viewer's left and right eyes are not viewing the first and fifth views, respectively, the viewer's left eye perceives a first view image and the viewer's right eye perceives a second view image to generate a binocular disparity so as to view a stereoscopic image.

For another example, when third view data (i.e., a third view image) is input to a sixth view, a seventh view, an eighth view, and a ninth view of the image panel, the viewer's left eye perceives a first view image and the viewer's right eye perceives a third view image. In this case, a depth between objects perceived by the viewer increases when compared to the foregoing example.

When nine views are used as described above, a first view image through a ninth view image may be input to a two overlapping views structure of viewing diamonds, but input data are overlapped by four (meaning four contiguous viewing diamonds show the same view image) to maintain a stereo type image. Accordingly, only a first view image and a second view image are input to reduce a difference between images perceived within a single eye, thereby reducing perceived 3D crosstalk.

Figure 22:
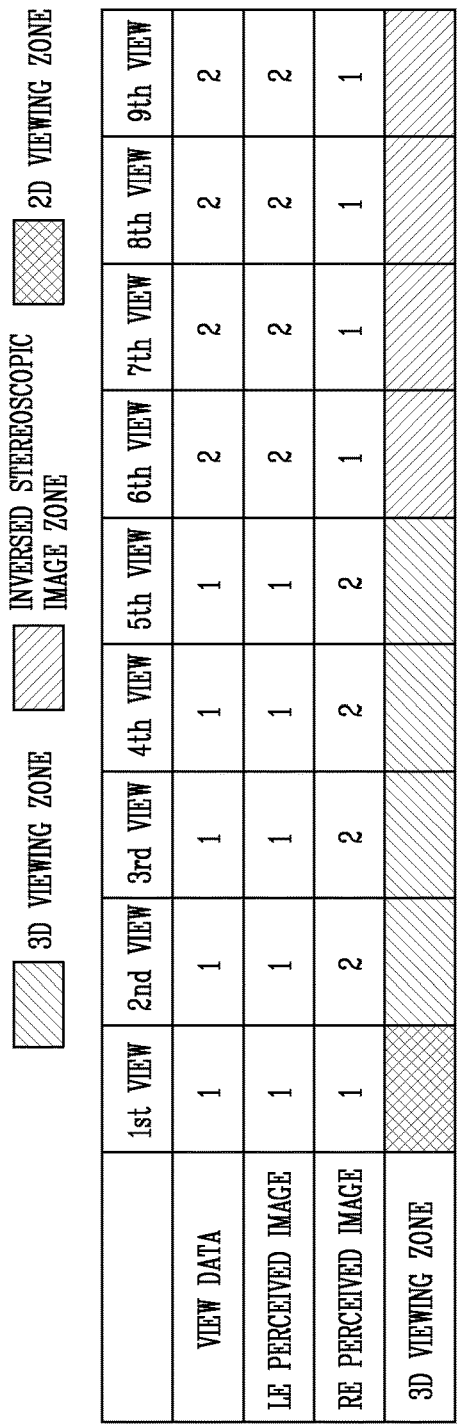
FIG. 22 is a view illustrating images and 3D viewing zones perceived from the left-eye and right-eye in an autostereoscopic 3D display device according to the third embodiment of the present disclosure illustrated in FIG. 19, as an example.

FIG. 22 is a view illustrating images and 3D viewing zones perceived from the left-eye and right-eye in an autostereoscopic 3D display device according to the third embodiment of the present disclosure illustrated in FIG. 19, as an example.

Referring to FIG. 22, as described above, first view data (i.e., a first view image) may be input to a first view, a second view, a third view, a fourth view, and a fifth view of the image panel, and second view data (i.e., a second view image) may be input to a sixth view, a seventh view, an eighth view, and a ninth view of the image panel.

In this case, when the viewer's left eye is located at a second view zone through a fifth view zone, the viewer's left eye perceives a first view image and the viewer's right eye perceives a second view image to generate a binocular disparity so as to view a stereoscopic image. At this time, when the viewer moves to locate the viewer's left eye at a sixth view zone through a ninth view zone, the viewer's left eye perceives a second view image and the viewer's right eye perceives a first view image to see an reversed stereoscopic image.

Furthermore, mapping for each view is carried out with stereo type view data as illustrated in FIGS. 21 and 22, and thus a view data overlapping zone broader than the basic unit occurs, and for an example, corresponds to a first view position of the image panel.

Accordingly, when the viewer's left eye perceives a first view of the image panel, the right eye perceives a fifth view of the image panel. Here, in both cases, a first view image is visible, and the viewer perceives a 2D image due to there being no image difference between each eye at the relevant position.

However, images having a disparity are perceived by the left-eye and right-eye in a mixed manner since there exists crosstalk between views, and thus it is difficult for the viewer to perceive them as 2D since the zone is too small. As a result, it has an effect of increasing a 3D viewing zone. In other words, a ratio of 3D viewing zone to the entire zone is 55%.

Figure 23A:
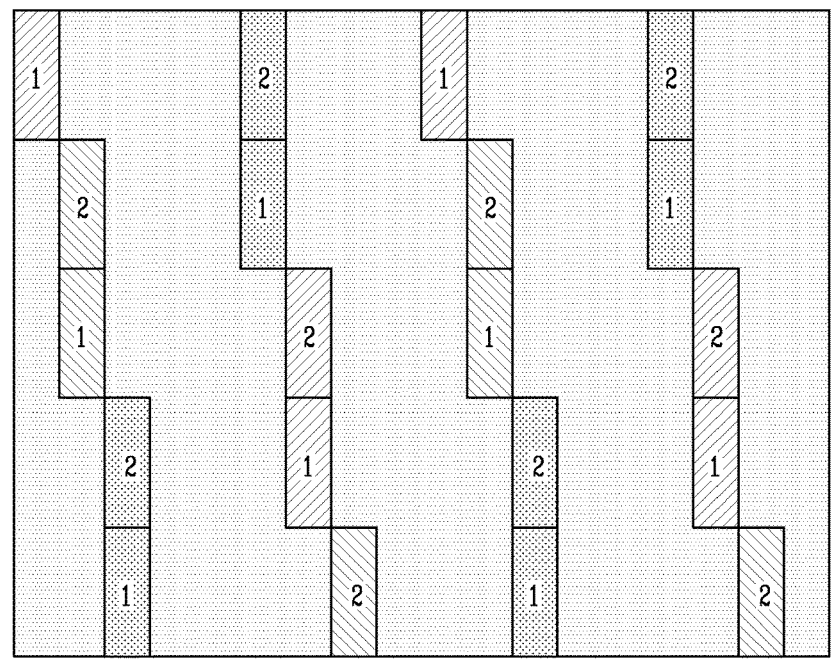
FIGS. 23A and 23B are views illustrating sub-pixels and views perceived from the left-eye and right-eye in an autostereoscopic 3D display device according to the third embodiment of the present disclosure illustrated in FIG. 19, as an example.
Figure 23B:
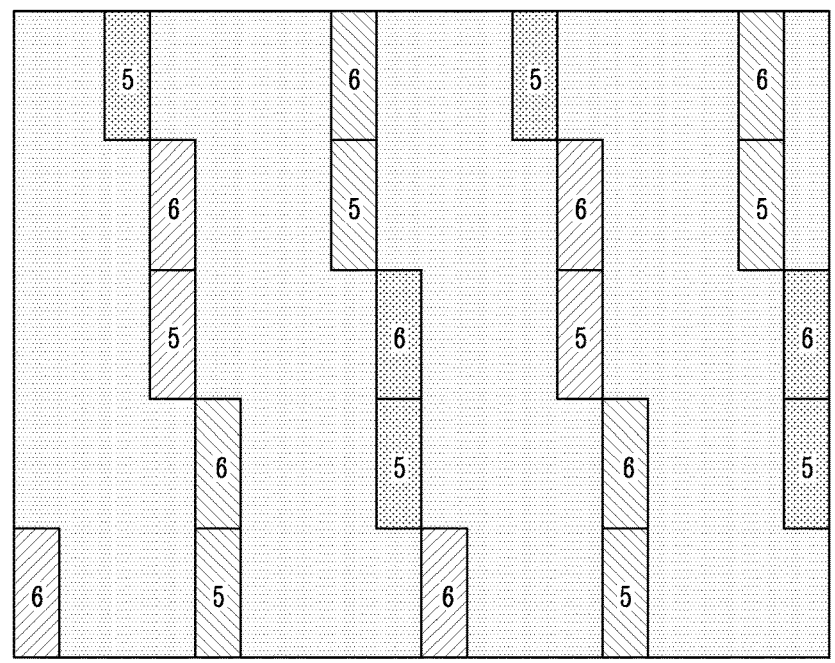

FIGS. 23A and 23B are views illustrating sub-pixels and views perceived from the left-eye and right-eye in an autostereoscopic 3D display device according to the third embodiment of the present disclosure illustrated in FIG. 19, as an example.

Figure 24A:
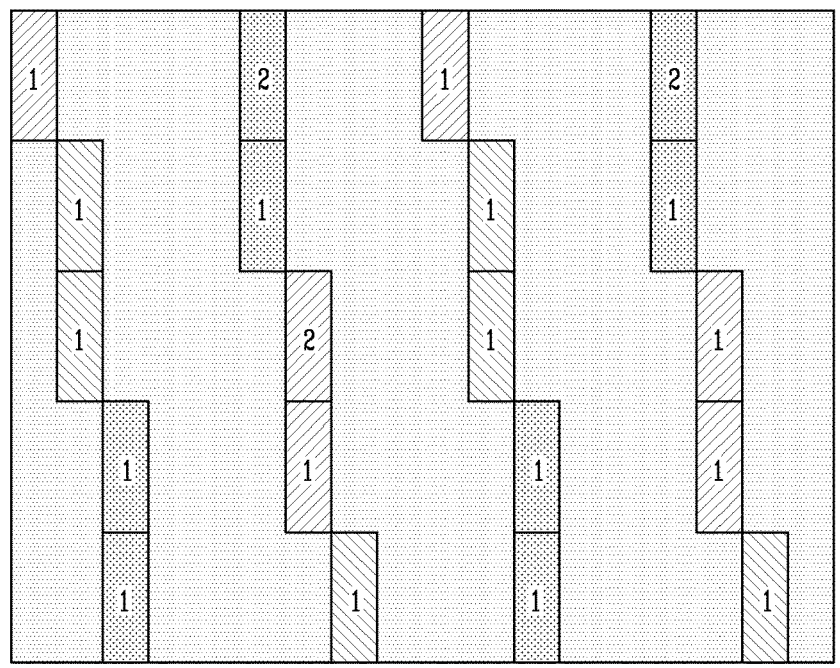
FIGS. 24A and 24B are views illustrating input data perceived from the left-eye and right-eye in an autostereoscopic 3D display device according to the third embodiment of the present disclosure illustrated in FIG. 19, as an example.
Figure 24B:
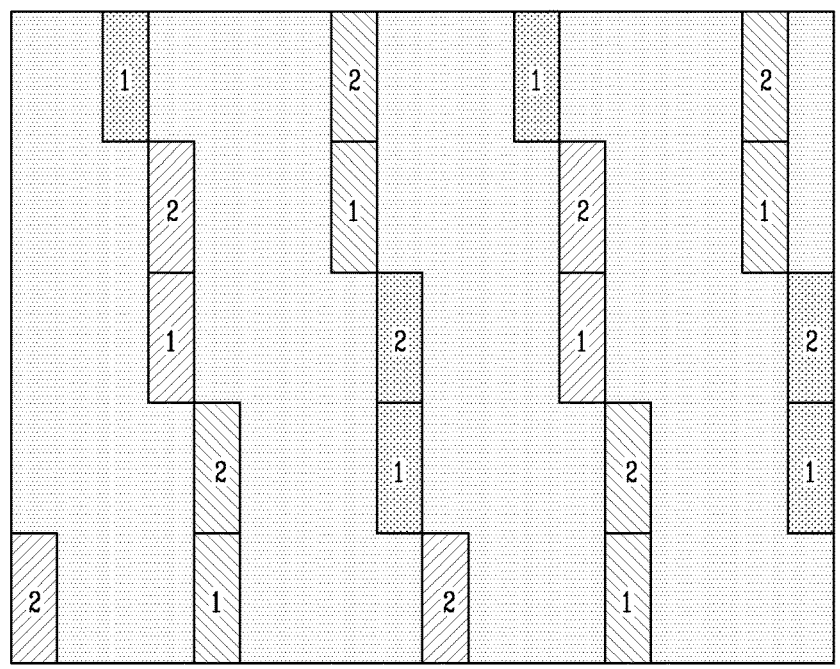

Furthermore, FIGS. 24A and 24B are views illustrating input data perceived from the left-eye and right-eye in an autostereoscopic 3D display device according to the third embodiment of the present disclosure illustrated in FIG. 19, as an example.

Here, FIGS. 23A and 24A illustrate sub-pixels, views, and input data perceived from the left-eye, as an example, and FIGS. 23B and 24B illustrate sub-pixels, views, and input data perceived from the right-eye, as an example.

Figure 25:
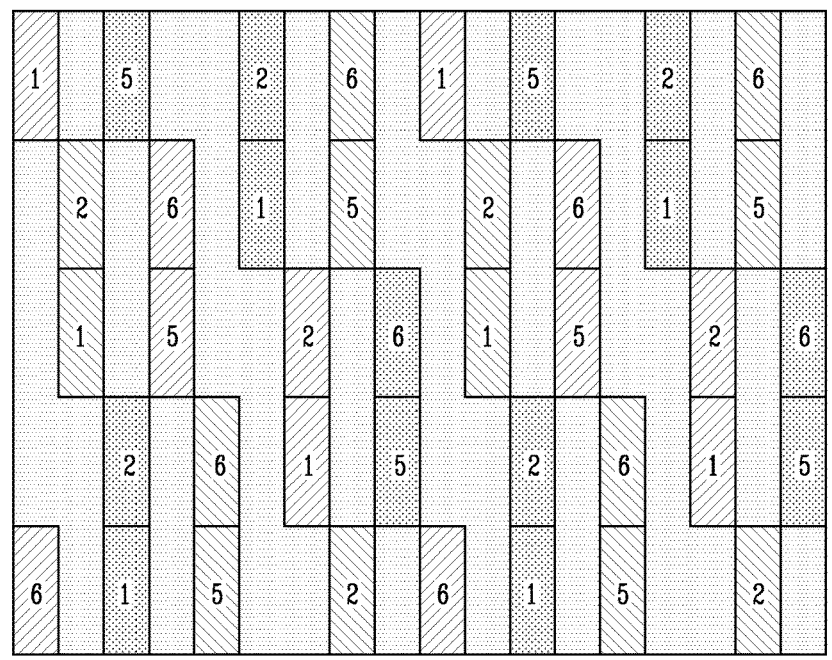
FIG. 25 is a view illustrating sub-pixels perceived from both eyes in an autostereoscopic 3D display device according to the third embodiment of the present disclosure illustrated in FIG. 19, as an example.
Figure 26:
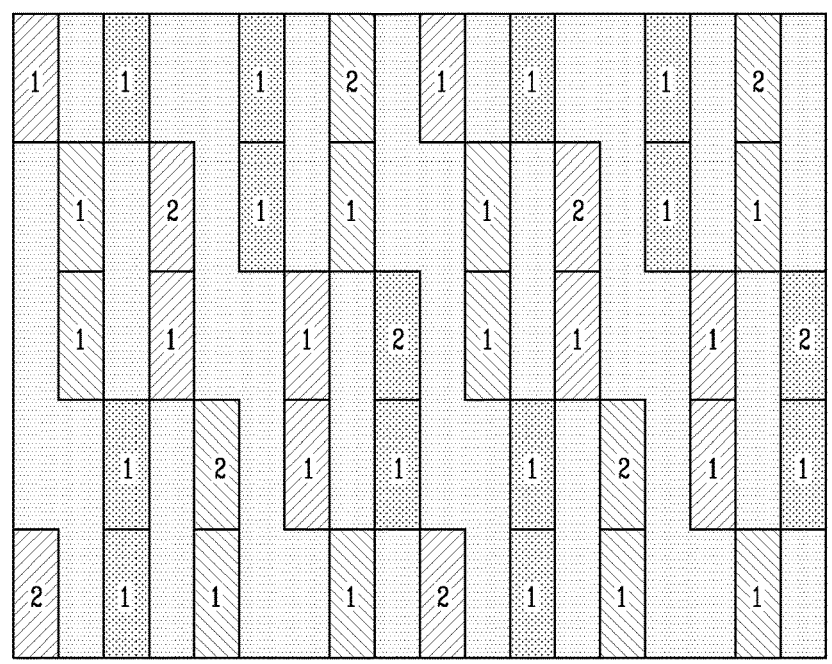
FIG. 26 is a view illustrating input data perceived from both eyes in an autostereoscopic 3D display device according to the third embodiment of the present disclosure illustrated in FIG. 19, as an example.

FIGS. 25 and 26 are views illustrating sub-pixels and input data perceived from both eyes in an autostereoscopic 3D display device according to the third embodiment of the present disclosure illustrated in FIG. 19, as an example.

In an ideal case where there is no 3D crosstalk between adjoining views, the number of views perceived by a viewer on NVD ½-based two overlapping viewing diamonds is two, based on a single eye. In other words, the number of views perceived by a single eye is the same as the overlapping number as described above. Accordingly, sub-pixels perceived by the left-eye and right-eye may be expressed as illustrated in FIGS. 23A and 23B.

Here, in an autostereoscopic 3D display device according to the third embodiment of the present disclosure, the width of a viewing diamond is based on half of the interocular distance, and thus when the left-eye perceives a first view, the right-eye perceives a third view if there is no overlapping viewing diamonds.

Accordingly, as three viewing diamonds further exist between the left-eye and right-eye in the case of a two overlapping views structure, when the left-eye perceives a first view, the right-eye perceives a fifth view, as illustrated in FIGS. 23A and 23B (refer to FIG. 25 for the case of both eyes).

In this case, a sub-pixel perceived from the left eye and a sub-pixel perceived from the right eye are separated by at least one or more sub-pixels. In other words, an interocular distance based case in the related art is susceptible to 3D crosstalk since sub-pixels perceived by the left-eye and right-eye are adjacent to each other, but the third embodiment of the present disclosure is resistant to 3D crosstalk since they are separated by one or more sub-pixels. Furthermore, the number of input element images may be reduced, and thus image flipping, which is a difference between images occurring when the viewer moves from a normal view zone to an inversed view zone, or from an inversed view zone, to a normal view zone, may be also reduced.

For reference, sub-pixels perceived seem to be partially omitted in the case of FIGS. 23A and 23B when compared to FIGS. 12A and 12B, but the size of an image perceived by the viewer in actuality is substantially the same since the sub-pixels are enlarged by lenticular lenses. Accordingly, in the case of single eye resolution, the third embodiment of the present disclosure has the same resolution as that of the related art in a structure having the same number of views and the same overlapping number of views.

Figures 27, 28:
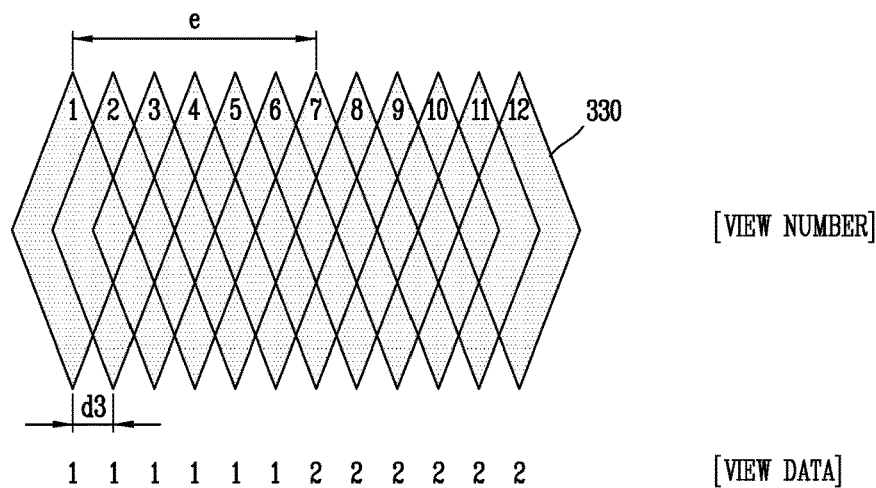
FIG. 27 is a view illustrating a view structure and view data of an autostereoscopic 3D display device according to a fourth embodiment of the present disclosure, as an example.
FIG. 28 is a view illustrating a pixel array written with a view map in an autostereoscopic 3D display device according to the fourth embodiment of the present disclosure, as an example.

Next, FIG. 27 is a view illustrating a view structure and view data of an autostereoscopic 3D display device according to a fourth embodiment of the present disclosure, as an example.

Here, FIG. 27 illustrates a view structure and view data of an autostereoscopic 3D display device to which an NVD technology is applied, as an example. Furthermore, FIG. 27 illustrates a twelve-view, three-overlapping views structure, as an example. However, the present disclosure is not limited to such a number of views and overlapping number of views.

Referring to FIG. 27, the number of views is twelve at this time and an NVD technology is applied, so the view distance (d3) corresponds to ⅙ of the interocular distance (e), namely, 10.83 mm.

In other words, since an NVD ½-based three-overlapping structure is applied thereto, the view distance (d3) corresponds to ⅙ of the interocular distance (e).

Since an autostereoscopic 3D display device according to the fourth embodiment of the present disclosure has a three overlapping views structure, as described above, sub-pixels perceived by a single eye of the viewer correspond to six views. In other words, when the viewer is located at an optimal viewing distance, six viewing diamonds 330 are formed between the left-eye and right-eye. Accordingly, an NVD ½-based embodiment with the same conditions as that of an interocular distance based four-view, two-overlapping views structure may be twelve-view with three-overlapping views, and the resulting view map is as shown in FIG. 28.

Furthermore, an NVD ½-based embodiment with the same conditions as that of an interocular distance based four-view, two-overlapping views structure may also be twelve-view, three-overlapping views, sixteen-view, four-overlapping views, and the like, in addition to the foregoing eight-view, two-overlapping views structure.

In this case, when the left eye perceives a first view, a second view, a third view, a fourth view, a fifth view, and a sixth view, the right eye perceives a seventh view, an eighth view, a ninth view, a tenth view, an eleventh view, and a twelfth view.

Here, first view data (i.e., a first view image) may be input to a first view, a second view, a third view, a fourth view, a fifth view, and a sixth view of the image panel, and second view data (i.e., a second view image) may be input to a seventh view, an eighth view, a ninth view, a tenth view, an eleventh view, and a twelfth view of the image panel.

FIG. 28 is a view illustrating a pixel array written with a view map in an autostereoscopic 3D display device according to the fourth embodiment of the present disclosure, as an example.

Here, FIG. 28 illustrates a pixel array in the case where twelve views are used, as an example. However, the present disclosure is not limited to the foregoing number of views.

Here, R, G, and B indicated at the top of FIG. 28 indicate the location of R, G, and B sub-pixels.

Referring to FIG. 28, when twelve views are used, as an example, a first view is allocated to a first sub-pixel, a second view is allocated to a second sub-pixel, a third view is allocated to a third sub-pixel, and a fourth view is allocated to a fourth sub-pixel. Furthermore, a fifth view is allocated to a fifth sub-pixel, a sixth view is allocated to a sixth sub-pixel, a seventh view is allocated to a seventh sub-pixel, and an eighth view is allocated to an eighth sub-pixel. In addition, a ninth view is allocated to a ninth sub-pixel, a tenth view is allocated to a tenth sub-pixel, an eleventh view is allocated to an eleventh sub-pixel, and a twelfth view is allocated to a twelfth sub-pixel.

To this end, the 3D filter may be implemented with a lenticular lens (not shown) having a slanted structure formed to be inclined at a predetermined angle with respect to the sub-pixels.

Here, a view map and the layout of lenticular lenses are repeatedly applied over the entire image panel.

Here, when the nearest same views are connected with a straight line, it is seen that red, green, and blue are not uniform, and a specific color is repeatedly shown twice, similarly to FIG. 18.

When a stereoscopic 3D display device is formed with the foregoing structure, image quality deterioration may occur due to horizontal lines, vertical lines, other color defects, and the like based on the layout.

Accordingly, a fifth embodiment of the present disclosure forms a view map and 3D filter with a modified format as follows.

Figure 29:
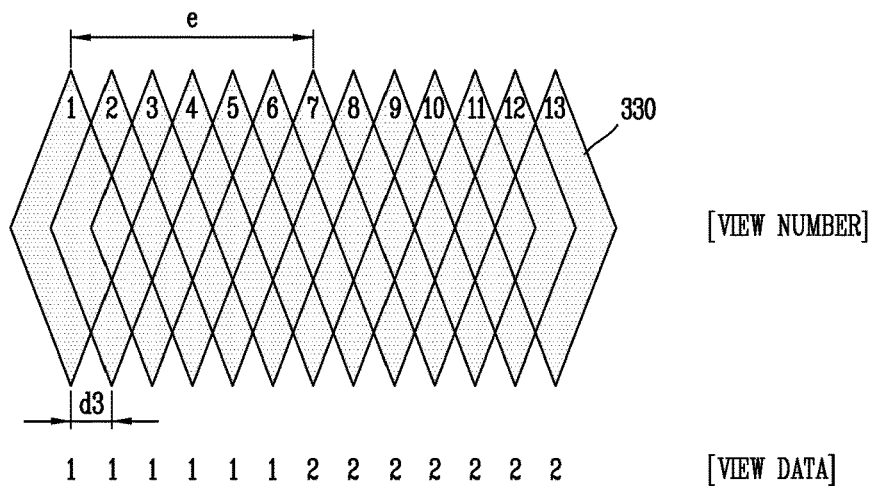
FIG. 29 is a view illustrating another view structure and view data of an autostereoscopic 3D display device according to a fifth embodiment of the present disclosure, as an example.

FIG. 29 is a view illustrating another view structure and view data of an autostereoscopic 3D display device according to the fifth embodiment of the present disclosure, as an example.

Here, FIG. 29 is a structure in which red, green, and blue are formed to have a balance therebetween, and a thirteen-yew, three-overlapping views structure is used in which one view is further added to the twelve-view, three-overlapping views structure of FIG. 27. However, the present disclosure is not limited to such a number of views and overlapping number of views.

Here, since a view structure should be configured to have a balance between red, green, and blue, a fourteen-view, three-overlapping views structure or a fifteen-view, three-overlapping views structure may be also applied thereto, but a single eye resolution, a change of viewing zone due to 2D overlapping zone, and the like should be collectively determined.

Referring to FIG. 29, the number of views is thirteen at this time, and thus the view distance (d3) corresponds to ⅙ of the interocular distance (e), namely, 10.83 mm, because an NVD technology the same as that of FIG. 27 is applied thereto.

In other words, an NVD ½-based two overlapping views structure is applied thereto, and thus the view distance (d2) corresponds to ⅙ of the interocular distance (e).

Since an autostereoscopic 3D display device according to the fifth embodiment of the present disclosure has a three overlapping views structure, as described above, sub-pixels perceived by a single eye of the viewer correspond to six views. In other words, when the viewer is located at an optimal viewing distance, six viewing diamonds 230 are formed between the left-eye and right-eye.

Here, when the viewer's left eye is located at a first view zone, the right eye is located at a seventh view zone. Furthermore, when the viewer's left eye is located at a seventh view zone, the right eye is located at a thirteenth view zone.

In this case, when the left eye perceives a first view, a second view, a third view, a fourth view, a fifth view, and a sixth view, the right eye perceives a seventh view, an eighth view, a ninth view, a tenth view, an eleventh view, and a twelfth view.

Here, for an example, first view data (i.e., a first view image) may be input to a first view, a second view, a third view, a fourth view, a fifth view, and a sixth view of the image panel, and second view data (i.e., a second view image) may be input to a seventh view, an eighth view, a ninth view, a tenth view, an eleventh view, a twelfth view, and a thirteenth view of the image panel.

Figure 30:
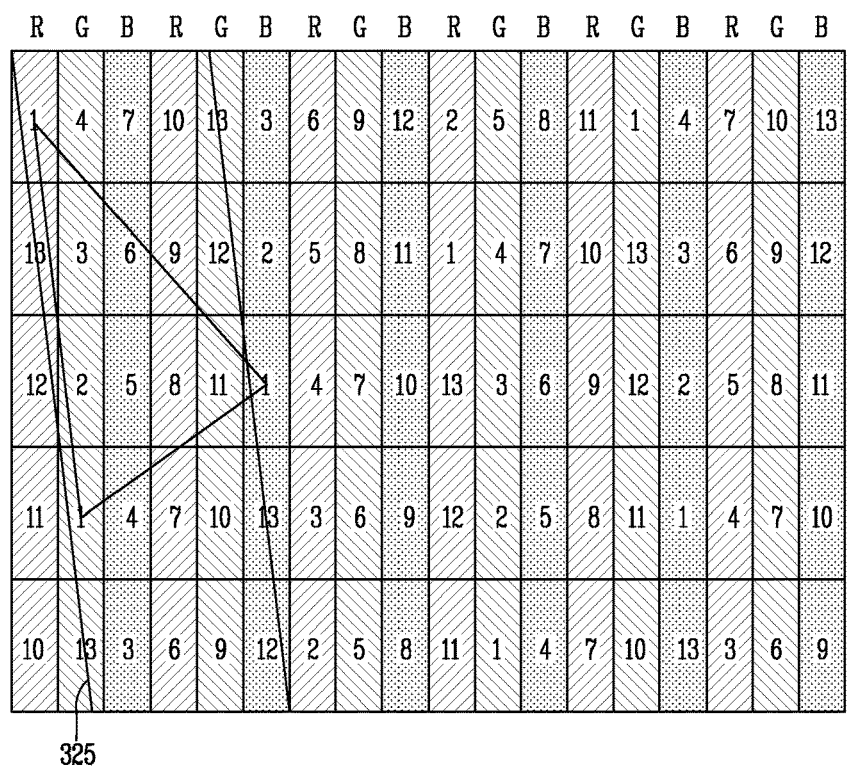
FIG. 30 is a view illustrating a pixel array and lenticular lens layout written with a view map in an autostereoscopic 3D display device according to the fifth embodiment of the present disclosure illustrated in FIG. 29, as an example.

FIG. 30 is a view illustrating a pixel array and lenticular lens layout written with a view map in an autostereoscopic 3D display device according to the fifth embodiment of the present disclosure illustrated in FIG. 29, as an example.

Here, FIG. 30 illustrates a pixel array in case where thirteen views are used, as an example. However, the present disclosure is not limited to the foregoing number of views.

Here, R, G, and B indicated at the top of FIG. 30 indicate the location of R, G, and B sub-pixels.

Figure 31:
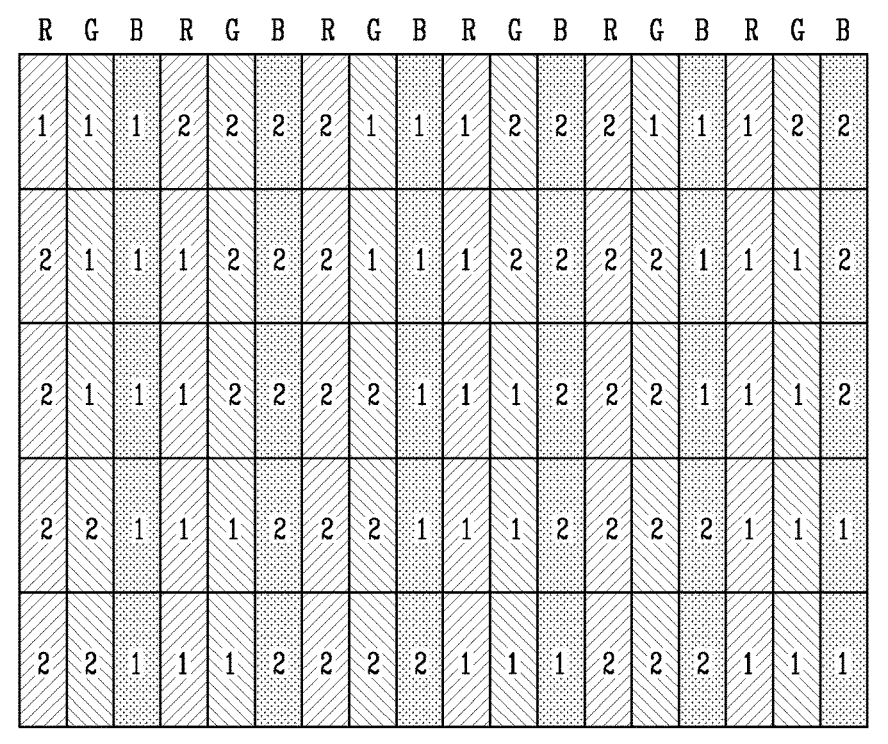

FIG. 31 is a view illustrating input data input to the pixel array illustrated in FIG. 29, as an example, in which stereo type image (i.e., 2-view image) data is shown. Accordingly, numerical values 1 and 2 illustrated in FIG. 31 indicate a first view image and a second view image, respectively.

Referring to FIG. 30, when m views are used (where m is a natural number), the image panel may allocate a first view through an m-th view to m sub-pixels in the unit of m sub-pixels.

In other words, a k-th view is allocated to a k-th sub-pixel among m sub-pixels (where k is a natural number satisfying the condition: 1≤k≤m).

For example, when thirteen views are used, a first view is allocated to a first sub-pixel, a second view is allocated to a second sub-pixel, and a third view is allocated to a third sub-pixel. Furthermore, a fourth view is allocated to a fourth sub-pixel, a fifth view is allocated to a fifth sub-pixel, and a sixth view is allocated to a sixth sub-pixel. Furthermore, a seventh view is allocated to a seventh sub-pixel, an eighth view is allocated to an eighth sub-pixel, and a ninth view is allocated to a ninth sub-pixel. Furthermore, a tenth view is allocated to a tenth sub-pixel, an eleventh view is allocated to an eleventh sub-pixel, and a twelfth view is allocated to a twelfth sub-pixel.

To this end, the 3D filter may be implemented with a lenticular lens 325 having a slanted structure formed to be inclined at a predetermined angle with respect to the sub-pixels. More specifically, the lenticular lens 325 having a slanted structure is formed to be inclined by a predetermined angle with respect to a major axis side of the sub-pixels.

Here, a view map and the layout of lenticular lenses 325 are repeatedly applied over the entire image panel.

Here, when the nearest same views are connected with a straight line, it is seen that red, green, and blue are configured to have a balance, in contrast to FIG. 28.

Referring to FIG. 31, sub-pixels perceived by a single eye of the viewer correspond to six views due to an NVD ½-based three overlapping views structure. Accordingly, when the left eye perceives a first view, a second view, a third view, a fourth view, a fifth view, and a sixth view, the right eye perceives a seventh view, an eighth view, a ninth view, a tenth view, an eleventh view, and a twelfth view.

Here, first view data (i.e., a first view image) may be input to a first view, a second view, a third view, a fourth view, a fifth view, and a sixth view of the image panel, and second view data (i.e., a second view image) may be input to a seventh view, an eighth view, a ninth view, a tenth view, an eleventh view, a twelfth view, and a thirteenth view of the image panel. In this case, the viewer's left eye perceives a first view image and the viewer's right eye perceives a second view image to generate a binocular disparity so as to view a stereoscopic image.

For another example, when third view data (i.e., a third view image) is input to a seventh view, an eighth view, a ninth view, a tenth view, an eleventh view, a twelfth view, and a thirteenth view of the image panel, the viewer's left eye perceives a first view image and the viewer's right eye perceives a third view image. In this case, a depth between objects perceived by the viewer increases when compared to the foregoing example.

When thirteen views are used as described above, a first view image through a thirteenth view image may be input due to a three overlapping views structure of viewing diamonds, but input data are overlapped by six (meaning contiguous sets of six viewing diamonds show the same view image) to maintain a stereo type. Accordingly, only a first view image and a second view image are input to reduce a difference between images perceived within a single eye, thereby reducing perceived 3D crosstalk.

FIG. 32 is a view illustrating images and 3D viewing zones perceived from the left-eye and right-eye in an autostereoscopic 3D display device according to the fifth embodiment of the present disclosure illustrated in FIG. 29, as an example.

Referring to FIG. 32, as described above, first view data (i.e., a first view image) may be input to a first view, a second view, a third view, a fourth view, a fifth view, and a sixth view of the image panel, and second view data (i.e., a second view image) may be input to a seventh view, an eighth view, a ninth view, a tenth view, an eleventh view, a twelfth view, and a thirteenth view of the image panel.

In this case, when the viewer's left eye is located at a first view zone through a sixth view zone, the viewer's left eye perceives a first view and the viewer's right eye perceives a second view to generate a binocular disparity so as to view a stereoscopic image. At this time, when the viewer moves to locate the viewer's left eye at an eighth view zone through a thirteenth view zone, the viewer's left eye perceives a second view image and the viewer's right eye perceives a first view image to see an reversed stereoscopic image.

Furthermore, because mapping for each view is carried out with stereo type view data as illustrated in FIGS. 31 and 32, a view data overlapping zone broader than the basic unit occurs, and, for example, corresponds to a seventh view zone of the image panel. In other words, a 2D zone in which the same view image is seen by both eyes, similar to the foregoing nine-view, two-overlapping views structure example described with reference to FIG. 22.

Accordingly, when the viewer's left eye perceives a seventh view of the image panel, the right eye perceives a thirteenth view of the image panel. Here, in both cases, a second view image is input and the viewer perceives a 2D image due to there being no image difference between both eyes at the relevant position.

However, as described above, images having a disparity are perceived by the left-eye and right-eye in a mixed manner since there exists crosstalk between views, and thus it is difficult for the viewer to perceive them as 2D since the zone is too small. As a result, it has an effect of increasing a 3D viewing zone. In other words, a ratio of the 3D viewing zone to the entire zone is about 53.8%.

Figure 33A:
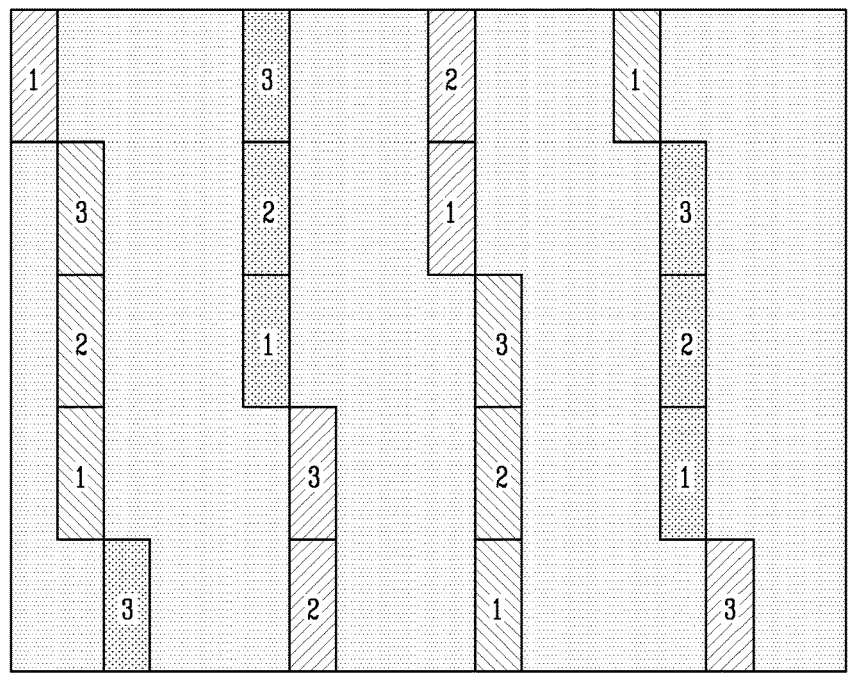
FIGS. 33A and 33B are views illustrating sub-pixels and views perceived from the left-eye and right-eye in an autostereoscopic 3D display device according to the fifth embodiment of the present disclosure illustrated in FIG. 29, as an example.
Figure 33B:
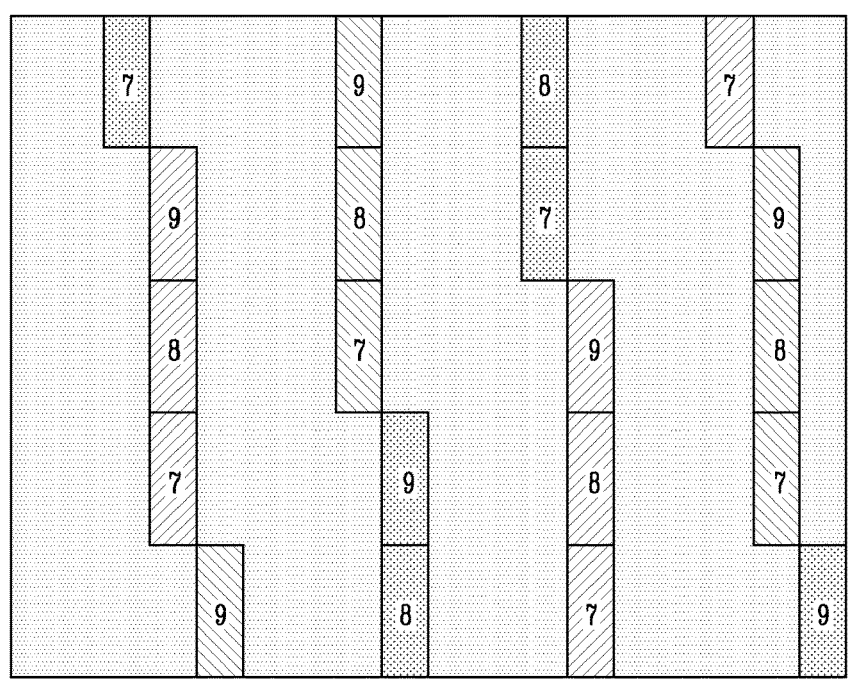

FIGS. 33A and 33B are views illustrating sub-pixels and views perceived from the left-eye and right-eye in an autostereoscopic 3D display device according to the fifth embodiment of the present disclosure illustrated in FIG. 29, as an example.

Figure 34A:
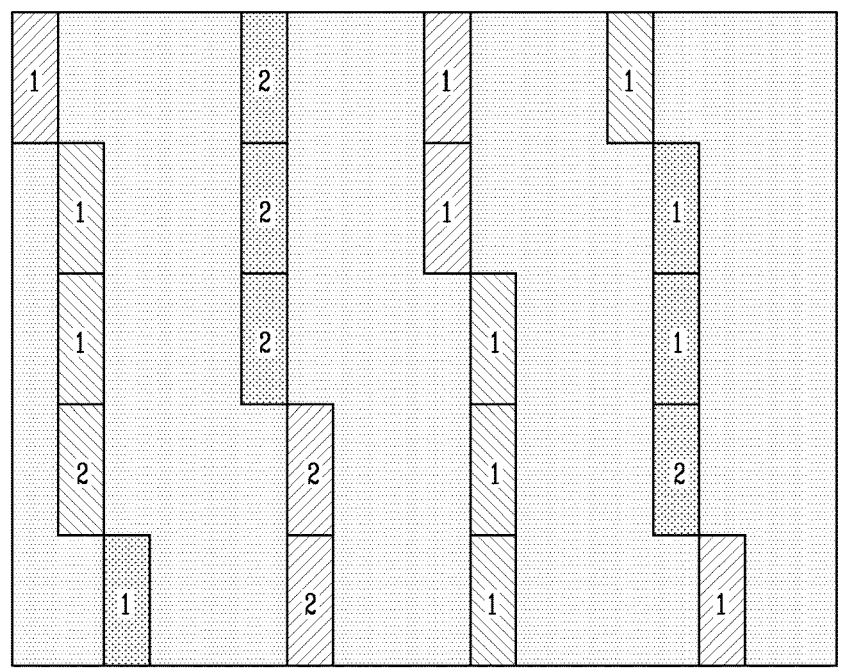
FIGS. 34A and 34B are views illustrating input data perceived from the left-eye and right-eye in an autostereoscopic 3D display device according to the fifth embodiment of the present disclosure illustrated in FIG. 29, as an example.
Figure 34B:
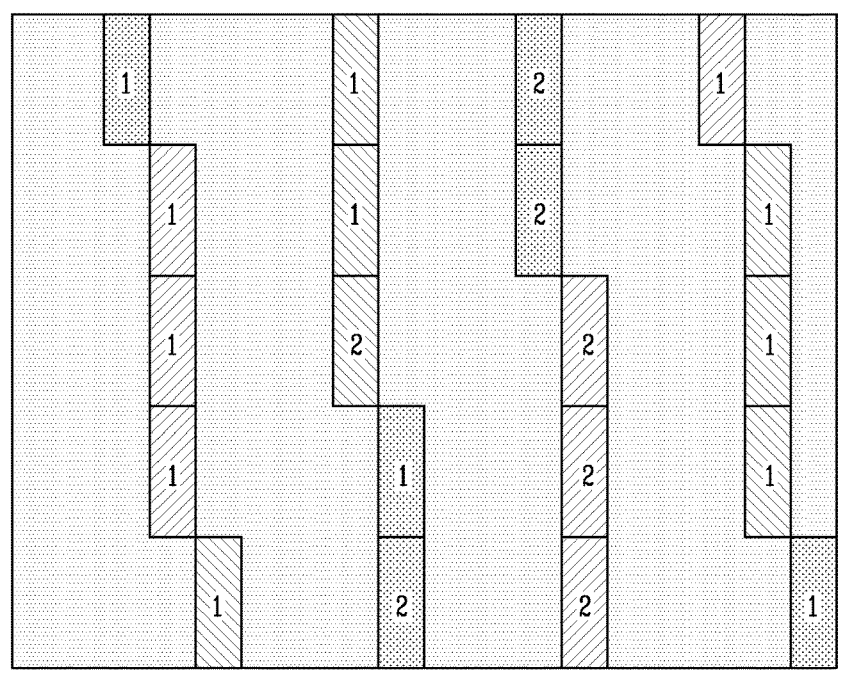

Furthermore, FIGS. 34A and 34B are views illustrating input data perceived from the left-eye and right-eye in an autostereoscopic 3D display device according to the fifth embodiment of the present disclosure illustrated in FIG. 29, as an example.

Here, FIGS. 33A and 34A illustrate sub-pixels, views and input data perceived from the left-eye as an example, and FIGS. 33B and 34B illustrate sub-pixels, views, and input data perceived from the right-eye, as an example.

Figure 35:
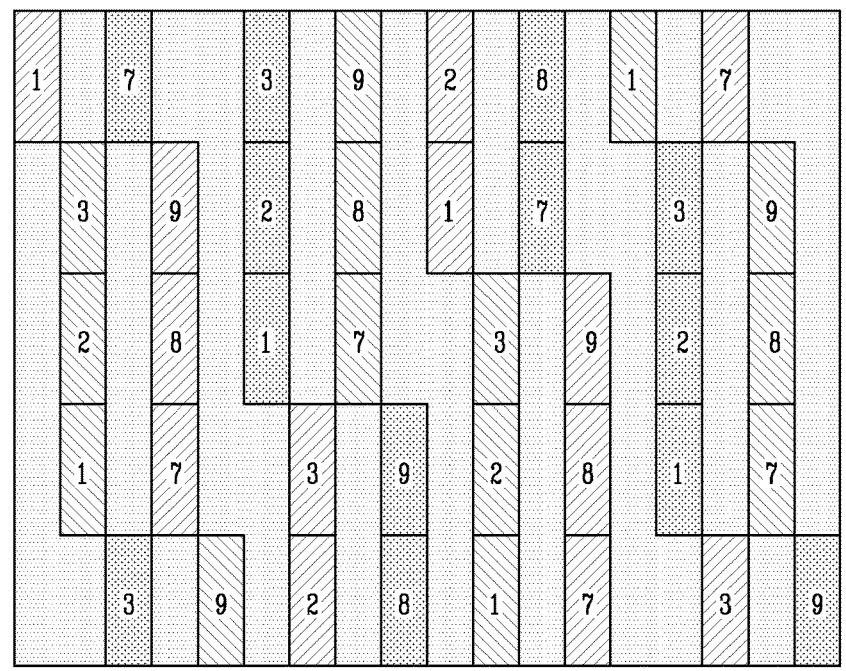
FIG. 35 is a view illustrating sub-pixels perceived from both eyes in an autostereoscopic 3D display device according to the fifth embodiment of the present disclosure illustrated in FIG. 29, as an example.
Figure 36:
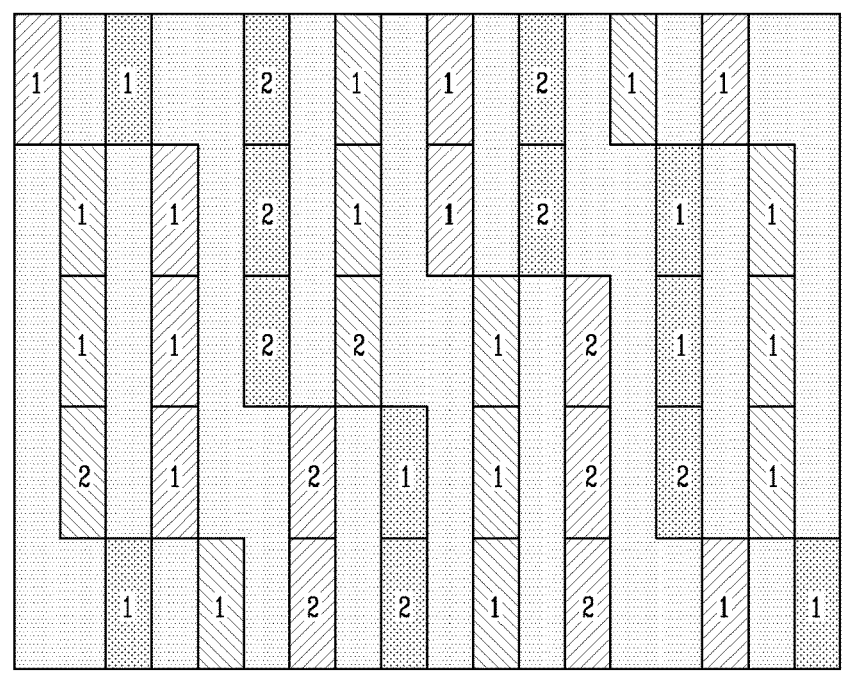
FIG. 36 is a view illustrating input data perceived from both eyes in an autostereoscopic 3D display device according to the fifth embodiment of the present disclosure illustrated in FIG. 29, as an example.

FIGS. 35 and 36 are views illustrating sub-pixels and input data perceived from both eyes in an autostereoscopic 3D display device according to the fifth embodiment of the present disclosure illustrated in FIG. 29, as an example.

In an ideal case where there is no 3D crosstalk between adjoining views, the number of views perceived by a viewer using an NVD ½-based two overlapping views structure is three, based on a single eye. In other words, the number of views perceived by a single eye is the same as the overlapping number as described above. Accordingly, sub-pixels perceived by the left-eye and right-eye may be expressed as illustrated in FIGS. 33A and 33B.

Here, in an autostereoscopic 3D display device according to the fifth embodiment of the present disclosure, the width of a viewing diamond is based on half of the interocular distance, and thus when the left-eye perceives a first view, the right-eye perceives a third view if there are no overlapping viewing diamonds.

Accordingly, as five viewing diamonds further exist between the left-eye and right-eye in the case of a three overlapping views structure, when the left-eye perceives a first view, the right-eye perceives a seventh view, as illustrated in FIGS. 33A and 33B (refer to FIG. 35 for the case of both eyes).

In this case, a sub-pixel perceived from the left eye and a sub-pixel perceived from the right eye are separated by at least one or more sub-pixels. In other words, an interocular distance based case in the related art is susceptible to 3D crosstalk since sub-pixels perceived by the left-eye and right-eye are adjacent to each other, but the fifth embodiment of the present disclosure is resistant to 3D crosstalk since they are separated by one or more sub-pixels. Furthermore, the number of input element images may be reduced, and thus image flipping, which is a difference between images occurred when the viewer moves from a normal view zone to an inversed view zone, or from an inversed view zone to a normal view zone, may also be reduced.

In other embodiments, the size of a viewing diamond may be set to a/n times, such as ⅓, ¼, and the like, of the interocular distance (where a and n are natural numbers satisfying the condition: a<n) in addition to half of the interocular distance, and, in such cases, sub-pixels perceived by the left eye and sub-pixels perceived by the right eye are separated by two, three, and other amounts of sub-pixels.

A basic view structure as described above may be set in consideration of all the factors, such as a resolution, an overlapping number, a viewing angle, and the like, of the image panel.

Accordingly, in addition to the foregoing embodiments, it may be possible to form various types of view map structures by reflecting on the description of the present disclosure, and therefore, a suitable view data rendering technology may be also applicable thereto.

Although many subject matters have been specifically disclosed in the foregoing description, they should be construed as an illustration of preferred embodiments rather than a limitation to the scope of invention. Consequently, the invention should not be determined by the embodiments disclosed herein but should be determined by the claims and the equivalents thereof.

What is claimed is:

1. An autostereoscopic 3D display device, comprising:
an image panel comprising a plurality of sub-pixels that collectively output light corresponding to stereo view data, the stereo view data defining a first view image and a second view image; and
a 3D filter disposed on a surface of the image panel, the 3D filter selectively directing portions of the outputted light to a plurality of viewing zones at a viewing distance, wherein the plurality of viewing zones is divided into repeating blocks of m viewing zones, m being an odd integer greater than 4, and, for each block, the portions of the outputted light form instances of the first view image in a first subset of the m viewing zones and instances of the second view image in a second subset of the m viewing zones, and wherein the first subset of the viewing zones has [(m−1)/2] viewing zones and the second subset of the viewing zones has [(m+1/2] viewing zones;

wherein the plurality of viewing zones are overlapped with each other and a width of each viewing zone is a proper fraction of an interocular distance between an observer's eyes.

2. The autostereoscopic 3D display device of claim 1, wherein the plurality of sub-pixels are divided into sets that are sequentially allocated with a first view through a m-th view, each set of sub-pixels corresponding to one of the blocks of viewing zones, and wherein each of the first view through the m-th view is either an instance of the first view image or an instance of the second view image.

3. The autostereoscopic 3D display device of claim 2, wherein the first view image is inputted to the first view through the [(m−1)/2] view of the image panel, and the second view image is inputted to the [(m+1)/2] view through the m view of the image panel.

4. The autostereoscopic 3D display device of claim 1, wherein the first subset of viewing zones include at least one location at which an instance of the first view image is formed at both of the observer's eyes.

5. The autostereoscopic 3D display device of claim 1, wherein each of the first subset of viewing zones overlaps at least one other viewing zone from the first subset of viewing zones and wherein each of the second subset of viewing zones overlaps at least one other viewing zone from the second subset of viewing zones, and wherein one of the viewing zones from the first subset of viewing zones overlaps one of the viewing zones from the second subset of viewing zones.

6. The autostereoscopic 3D display device of claim 1, wherein the second subset of the viewing zones contains one more viewing zone than the first subset of the viewing zones.

7. The autostereoscopic 3D display device of claim 1, wherein the 3D filter comprises a lenticular lens slanted with respect to the sub-pixel at a predetermined angle.

8. The autostereoscopic 3D display device of claim 1, further comprising:
a host system supplying the stereo view data to a timing controller,
wherein the stereo view data include view data for a left-eye and view data for a right-eye.

9. The autostereoscopic 3D display device of claim 1, wherein the 3D display device lacks a multi-view converter.

10. The autostereoscopic 3D display device of claim 1, further comprising:
an intervening layer interposed between the image panel and the 3D filter,
wherein the width of each viewing zone is the proper fraction of the interocular distance when a thickness of the intervening layer is a product of the reciprocal of the proper fraction and a base thickness of the intervening layer.

11. The autostereoscopic 3D display device of claim 10, wherein the intervening layer is a gap glass.

12. The autostereoscopic 3D display device of claim 1, wherein a distance between centers of adjacent viewing zones is less than the interocular distance.

13. The autostereoscopic 3D display device of claim 1, wherein the plurality of viewing zones are diamond shaped.

14. The autostereoscopic 3D display device of claim 1, wherein the distance between the observer's eyes is an estimate based on a typical distance between human eyes.

15. The autostereoscopic 3D display device of claim 2, wherein the first view through the m-th view are allocated to the image panel such that a first sub-pixel, a second sub-pixel, and a third sub-pixel nearest to each other in the image panel and outputting a same view include one red sub-pixel, one green sub-pixel, and one blue sub-pixel.

16. The autostereoscopic 3D display device of claim 1, wherein the first subset of viewing zones in a block has four viewing zones and the second subset of viewing zones in the block has five viewing zones.

17. The autostereoscopic 3D display device of claim 1, wherein the first subset of viewing zones in a block has six viewing zones and the second subset of viewing zones in the block has seven viewing zones.

* * * * *